(12) United States Patent
Bae et al.

(10) Patent No.: US 9,391,685 B2
(45) Date of Patent: Jul. 12, 2016

(54) COMPUTING SYSTEM WITH PRE-CODING MECHANISM AND METHOD OF OPERATION THEREOF

(71) Applicant: Samsung Electronics Co., Ltd., Suwon-si, Gyeonggi-Do (KR)

(72) Inventors: Jung Hyun Bae, San Diego, CA (US); Hyukjoon Kwon, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/454,512

(22) Filed: Aug. 7, 2014

(65) Prior Publication Data

US 2015/0049827 A1   Feb. 19, 2015

Related U.S. Application Data

(60) Provisional application No. 61/866,374, filed on Aug. 15, 2013.

(51) Int. Cl.
| | |
|---|---|
| *H04L 27/00* | (2006.01) |
| *H04B 7/06* | (2006.01) |
| *H04L 25/03* | (2006.01) |
| *H04B 7/08* | (2006.01) |
| *H04L 25/02* | (2006.01) |

(52) U.S. Cl.
CPC ........ *H04B 7/0619* (2013.01); *H04L 25/03343* (2013.01); *H04B 7/0882* (2013.01); *H04L 25/0204* (2013.01)

(58) Field of Classification Search
CPC ................. H04L 25/03343; H04B 7/0452
See application file for complete search history.

(56) References Cited

U.S. PATENT DOCUMENTS

| | | | |
|---|---|---|---|
| 8,478,190 B2 | 7/2013 | Sayana et al. | |
| 2008/0207328 A1* | 8/2008 | Slough ................. | G06Q 30/02 463/42 |
| 2008/0273618 A1* | 11/2008 | Forenza ................ | H04B 7/022 375/261 |
| 2010/0002598 A1* | 1/2010 | Pan et al. ...................... | 370/252 |
| 2012/0120970 A1* | 5/2012 | Wang et al. .................. | 370/480 |
| 2013/0078991 A1 | 3/2013 | Nam | |
| 2013/0156139 A1 | 6/2013 | Lee et al. | |

(Continued)

OTHER PUBLICATIONS

F.Rashid-Farrokhi et al., "Transmit Beamforming and Power Control for Cellular Wireless Systems", IEEE JSAC, Oct. 1998.

(Continued)

*Primary Examiner* — Shuwang Liu
*Assistant Examiner* — Gina McKie
(74) *Attorney, Agent, or Firm* — IP Investment Law Group

(57) ABSTRACT

A computing system includes: an inter-device interface configured to determine receiver description for representing a receiver signal corresponding to serving signal contemporaneous with an interference signal from an interference source at an interference-aware receiver; a communication unit, coupled to the inter-device interface, configured to: generate a pre-coding candidate set based on the receiver description for adjusting the serving signal or a subsequent instance thereof, determine a sum-rate condition for representing the serving signal along with the interference signal, and generate a pre-coding adjustment maximizing the sum-rate condition from the pre-coding candidate set for communicating the serving signal or a subsequent instance thereof.

20 Claims, 6 Drawing Sheets

(56) References Cited

U.S. PATENT DOCUMENTS

2013/0230013 A1 9/2013 Seo et al.
2014/0105127 A1 4/2014 Zhuang et al.

OTHER PUBLICATIONS

R. H. Etkin, D. N. C. Tse, and H. Wang, "Gaussian interference channel capacity to within one bit", IEEE Trans. Inf. Theory, vol. 54, pp. 5534-5562, Dec. 2008.

G. Fodor, et al., "Intercell Interference Coordination in OFDMA Networks and in the 3GPP Long Term Evolution System", Journal of Communications, vol. 4, No. 7, Aug. 2009.

A. Hameed, D. Yang, J. Geng, I. Ahmad, and B. Li, "A Hybrid Scheme for Interference Mitigation in Cooperative Multi-Cell Transmission Systems", Journal of Computational Information Systems 9: 2 (2013), p. 433-444.

A. Manolakos, Y. Noam, and A. Goldsmith, "Null Space Learning in Cooperative MIMO Cellular Networks Using Interference Feedback".

J. Li, B. Makki, T. Swensson, and T. Eriksson, "Power Allocation for Multi-Point Joint Transmission with Different Node Activeness", Wireless Communications and Networking Conference, IEEE, pp. 4220-4225, (2013).

\* cited by examiner

US 9,391,685 B2

COMPUTING SYSTEM WITH PRE-CODING MECHANISM AND METHOD OF OPERATION THEREOF

CROSS-REFERENCE TO RELATED APPLICATION(S)

This application claims the benefit of U.S. Provisional Patent Application Ser. No. 61/866,374 filed Aug. 15, 2013, and the subject matter thereof is incorporated herein by reference thereto.

TECHNICAL FIELD

An embodiment of the present invention relates generally to a computing system, and more particularly to a system with pre-coding mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with pre-coding mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an inter-device interface configured to determine receiver description for representing a receiver signal corresponding to serving signal contemporaneous with an interference signal from an interference source at an interference-aware receiver; a communication unit, coupled to the inter-device interface, configured to: generate a pre-coding candidate set based on the receiver description for adjusting the serving signal or a subsequent instance thereof, determine a sum-rate condition for representing the serving signal along with the interference signal, and generate a pre-coding adjustment maximizing the sum-rate condition from the pre-coding candidate set for communicating the serving signal or a subsequent instance thereof.

An embodiment of the present invention provides a method of operation of a computing system including: determining receiver description for representing a receiver signal corresponding to serving signal contemporaneous with an interference signal from an interference source at an interference-aware receiver; generating a pre-coding candidate set based on the receiver description for adjusting the serving signal or a subsequent instance thereof; determining a sum-rate condition for representing the serving signal along with the interference signal; and generating a pre-coding adjustment maximizing the sum-rate condition from the pre-coding candidate set with a communication unit for communicating the serving signal or a subsequent instance thereof.

An embodiment of the present invention provides a non-transitory computer readable medium including instructions for operating a computing system including: determining receiver description for representing a receiver signal corresponding to serving signal contemporaneous with an interference signal from an interference source at an interference-aware receiver; generating a pre-coding candidate set based on the receiver description for adjusting the serving signal or a subsequent instance thereof; determining a sum-rate condition for representing the serving signal along with the interference signal; and generating a pre-coding adjustment maximizing the sum-rate condition from the pre-coding candidate set for communicating the serving signal or a subsequent instance thereof.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
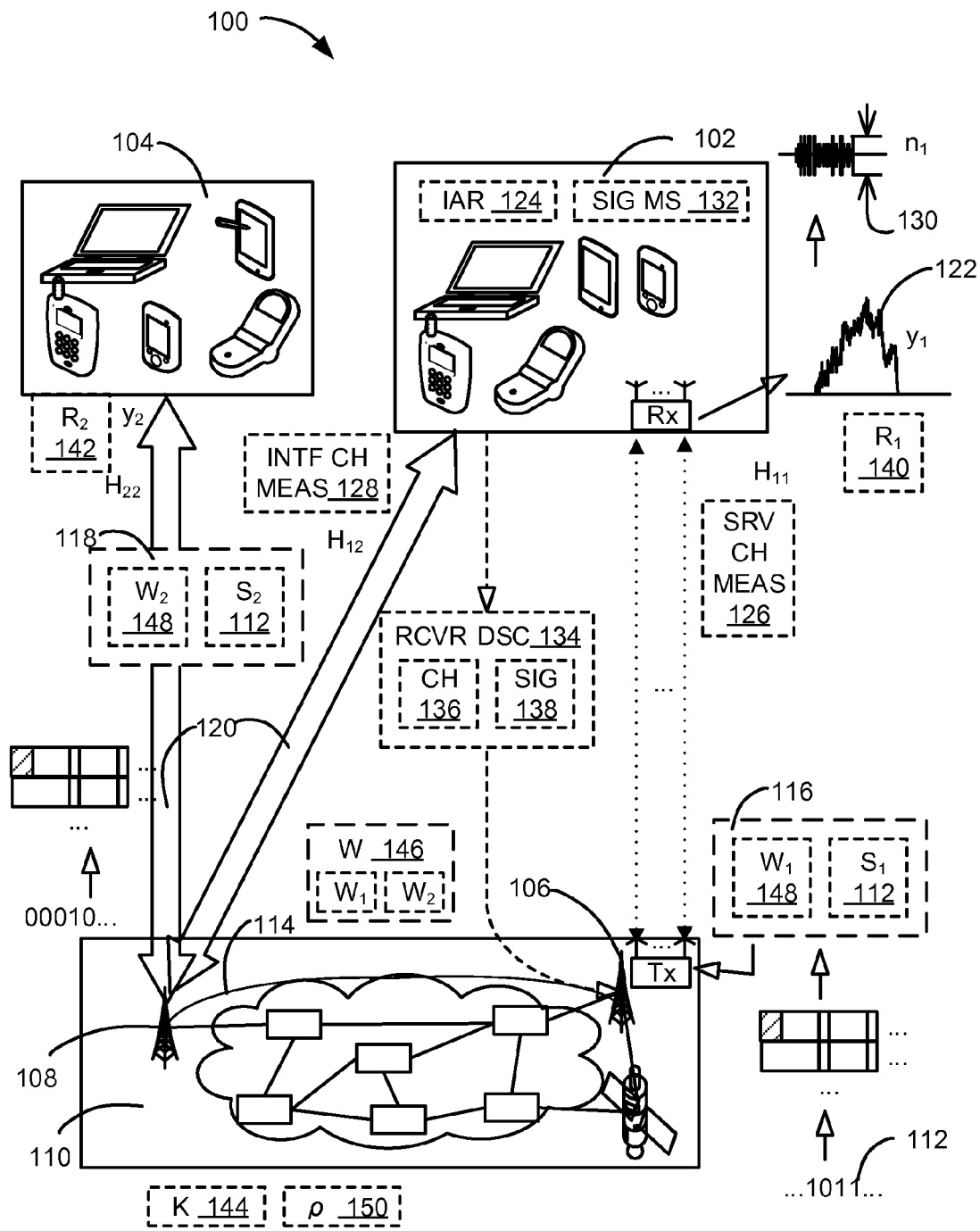
FIG. 1 is a computing system with pre-coding mechanism in an embodiment of the present invention.

The following embodiments of the present invention can be used to coordinate transmission of a serving signal and an interference signal for multiple transmitting devices. A pre-coding candidate set can be generated based on receiver description representing a communication environment. An assumption category and a sum-rate condition corresponding thereto can be determined according to the communication environment. The pre-coding candidate set can be narrowed or reduced based on the assumption category. The narrowed instance of the pre-coding candidate set can be used to generate pre-coding adjustment corresponding to the multiple transmitting devices based on the sum-rate condition.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with pre-coding mechanism in an embodiment of the present invention. The computing system 100 can include a first user device 102, a second user device 104, a first node device 106, a second node device 108, or a combination thereof.

The first user device 102, the second user device 104, or a combination thereof can include a client device or a personal device, a server device, a communication device, or a combination thereof. The first user device 102, the second user device 104, or a combination thereof can be a mobile device including a cellular phone or a notebook computer, or a wearable device, or a combination thereof connected to a network 110. The first user device 102, the second user device 104, or a combination thereof can communicate using wired communication mechanism or a wireless communication mechanism. The first user device 102, the second user device 104, or a combination thereof can include a user equipment (UE).

The network 110 is a system of wired or wireless communication devices or means that are connected to each other for enabling communication between devices. The network 110 can include a wire, a transmitter, a receiver, an antenna, a tower, a base station, a coordinating device, a repeater, telephone network, a server, a client device, or a combination thereof. Also for example, the network 110 can include a wireless cellular network. Also for example, the network 110 can also include a combination of routers, cables, computers, servers, and client devices for various sized area networks.

The computing system 100 can include the first node device 106, the second node device 108, or a combination thereof for directly or indirectly linking and communicating with the first user device 102, the second user device 104, or a combination thereof. The network 110 can include the first node device 106, the second node device 108, or a combination thereof for accessing the network 110.

The first node device 106, the second node device 108, or a combination thereof can receive wireless signals from the first user device 102, the second user device 104, or a combination thereof, transmit signals thereto, process signals, or a combination thereof. The first node device 106, the second node device 108, or a combination thereof can also communicate or relay signals, such as by sending or receiving signals, between other base stations, components within the network 110, or a combination thereof. The first node device 106 and the second node device 108 can similarly communicate with each other or other node devices.

The first user device 102, the second user device 104, or a combination thereof can be connected to the network 110 through the first node device 106, the second node device 108, or a combination thereof. For example, the first node device 106, the second node device 108, or a combination thereof can include a user device or a mobile device acting as a base station, an access point, a hub, a hotspot, a tethering point, a peer-to-peer network component, or a combination thereof. Also for example, the first node device 106, the second node device 108, or a combination thereof can include a base station.

Also for example, the first node device 106, the second node device 108, or a combination thereof can include a communication device or a processing component included in or with a cell tower, a wireless router, an antenna, or a combination thereof being used to communicate with the first user device 102, the second user device 104, or a combination thereof. Also for example, the first node device 106, the second node device 108, or a combination thereof can include an evolved node B (eNodeB) as an element in an air interface representing evolved UMTS terrestrial radio access (e-UTRA).

The first node device 106, the second node device 108, or a combination thereof can further include a coordinating device. The first node device 106, the second node device 108, or a combination thereof can include the base station, the coordination device, or a combination thereof.

The first node device 106, the second node device 108, or a combination thereof can coordinate activities of multiple transmitters, locations or areas, cells, or a combination thereof. For example, first node device 106, the second node device 108, or a combination thereof including the coordinating device can control simultaneous transmission of multiple communications for multiple cells, multiple base stations, or a combination thereof.

The first user device 102, the second user device 104, or a combination thereof can connect to and communicate with other devices, such as each other, other mobile devices, servers, computers, telephones, or a combination thereof. For example, the first user device 102, the second user device 104, or a combination thereof can communicate with other devices by transmitting signals, receiving signals, processing signals, or a combination thereof. Also for example, the first user device 102, the second user device 104, or a combination thereof can communicate by displaying a content 112 in the signals, audibly recreating sounds according to the content 112 in the signals, processing according to the content 112, such as storing an application or updating an operating system, or a combination thereof.

The first node device 106, the second node device 108, or a combination thereof can be used to wirelessly exchange signals for communication, including voice signals of a telephone call or data representing a webpage and interactions therewith. The first node device 106, the second node device 108, or a combination thereof can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The network 110 can further include a node link 114. The node link 114 can include a method, a process, or a mechanism for directly communicating information between node devices or access points.

For example, the node link 114 can include the coordinating device for managing the first node device 106, the second node device 108, or a combination thereof. Also for example, the node link 114 can include a wired or wireless communication channel or connection, exchanged information, communication protocol, a method or a process for further processing the exchanged information, or a combination thereof between the first node device 106 and the second node device 108. As a more specific example, the node link 114 can include a back-haul channel for communicating between base stations.

The computing system 100 can process the content 112 for communication. For example, the first user device 102, the second user device 104, the first node device 106, the second node device 108, or a combination thereof can format the content 112 according to a coding scheme, such as turbo coding scheme or polar coding scheme. Also for example, the first user device 102, the second user device 104, the first node device 106, the second node device 108, or a combination thereof can apply a modulation scheme, such as such as quadrature amplitude modulation (QAM), phase-shift keying (PSK), or a derivation thereof for the content 112.

The computing system 100 can generate a communication signal from processing the content 112. For example, the first node device 106 can generate a serving signal 116 intended for communication with the first user device 102. Also for example, the second node device 108 can generate an interference signal 118 intended for communication with the second user device 104.

The serving signal 116 is communicated information intended for a device receiving and processing the serving signal 116. The interference signal 118 is communicated information not intended for the device receiving and processing the interference signal 118 at the time of the reception.

The first node device 106 can process an instance of the content 112, such as by coding, modulating, or a combination of processes thereof to generate the serving signal 116. The second node device 108 can process a further instance of the content 112 in a similar manner to generate the interference signal 118.

The computing system 100 can include devices exchanging the content 112 over communication channels 120. For example, the first node device 106 can transmit the serving signal 116, which can traverse a specific instance of the communication channels 120 to reach the first user device 102, the second user device 104, or a combination thereof. Also for example, the second node device 108 can transmit the interference signal 118, which can traverse a further instance of the communication channels 120 to reach the first user device 102, the second user device 104, or a combination thereof.

The communication channels 120 can include environments or connections between device exchanging signals. The communication channels 120 can each include be a direct link between corresponding devices, such as between the UE and the node device. The communication channels 120 can correspond to signals intended or unintended for exchange between corresponding devices.

Each instance of the communication channels 120 can include repeaters, amplifiers, or a combination thereof therebetween for an indirect link. Each instance of the communication channels 120 can further include a specific instance or value of communication detail, such as frequency, time slot, packet designation, transmission rate, channel code, or a combination thereof used for transmitting signals between intended devices.

Each instance of the communication channels 120 can further include physical characteristics unique to geographic locations associated with the corresponding devices. The communication channels 120 can include structures or influences, such as fading characteristics of signals or causes for unique delay or reflection of signals, affecting the transmission of wireless signals. The communication channels 120 can distort or alter the signals traversing therein.

Each transmitted signal can traverse an instance of the communication channels 120 and be received as a receiver signal 122 at a particular device. The receiver signal 122 can include data or information available to or captured at a particular device. The receiver signal 122 can correspond to the serving signal 116, the interference signal 118, or a combination thereof.

For illustrative purposes, the computing system 100 will be described as receiving the receiver signal 122 at the first user device 102. However, it is understood that the computing system 100 can receive the receiver signal 122 at the first user device 102, the second user device 104, the first node device 106, the second node device 108, the coordinating device, or a combination thereof.

The computing system 100 can include an interference-aware receiver 124 (JAR) for processing the receiver signal 122. For example, the first user device 102, the second user device 104, the first node device 106, the second node device 108, or a combination thereof can include the interference-aware receiver 124.

The interference-aware receiver 124 is a device or a portion thereof configured to process and utilize the content 112 in an unintended or unexpected signal in processing for an intended or expected signal. For example, the interference-aware receiver 124 can process the interference signal 118 in processing for the serving signal 116.

The interference-aware receiver 124 can include an interference aware detector, decoder, or a combination thereof.

The interference-aware receiver 124 can further include a joint detector, decoder, or a combination thereof configured to recognize, whiten, cancel or remove, detect, decode, or a combination thereof for the interference signal 118 in processing the serving signal 116

The computing system 100 can utilize the interference-aware receiver 124 by determining information, such as formatting or control information, describing the unintended or unexpected signal. For example, the computing system 100 can communicate the modulation and coding scheme (MCS) of the interference signal 118 to the first user device 102 through the first node device 106 and the node link 114. Also for example, the computing system 100 can estimate the MCS of the interference signal 118 with the interference-aware receiver 124.

The interference-aware receiver 124 can determine the content 112 of the signal unintended for or unexpected by the receiving device. For example, the interference-aware receiver 124 can detect, decode, or a combination thereof for the interference signal 118. Also for example, the interference-aware receiver 124 can determine a bit, a symbol, an estimate thereof, or a combination thereof corresponding to the content 112 in the interference signal 118.

The interference-aware receiver 124 can use the content 112 corresponding to the interference signal 118 in processing for the serving signal 116. For example, the interference-aware receiver 124 can use the bit, the symbol, the estimate thereof, or a combination thereof corresponding to the interference signal 118 in determining the content 112 corresponding to the serving signal. Also for example, the interference-aware receiver 124 can jointly detect, jointly decode, or a combination thereof for both the interference signal 118 and the serving signal 116, or successively cancel the interference signal 118 in processing for the content 112 of the serving signal 116.

For illustrative purposes, the computing system 100 will be described from the perspective of the first user device 102 and the first node device 106 intending to communicate with each other using the serving signal 116 and receiving the interference signal 118 intended between the second user device 104 and the second node device 108. However, it is understood that the computing system 100 can utilize the below described processes for communicating between or from the perspective of the first user device 102, the second user device 104, the first node device 106, the second node device 108, or a combination thereof.

Also for illustrative purposes, the computing system 100 will be described from the perspective of the first node device 106 coordinating communication with the second node device 108. However, it is understood that the processes described below can be applicable to or executed by the first node device 106, the second node device 108, the first user device 102, the second user device 104, a separate coordination device, or a combination thereof.

Also for illustrative purposes, the interference signal 118 is described as communication between the second user device 104 and the second node device 108. However, it is understood that the interference signal 118 can be any information unintended for the receiving device at that time, such as from the first user device 102, the second user device 104, the first node device 106, the second node device 108, or a combination thereof.

The computing system 100 can process the serving signal 116, the interference signal 118, or a combination thereof utilizing one or more instances of a data stream or a layer. The data stream can include a connection or a mechanism for communicating a specific sequence of information. The data stream can include a layer, a distinct combination between an instance of transmitting antenna and an instance of receiving antenna, a timing or a frequency for communicating a particular sequence of data, or a combination thereof.

The computing system 100 can utilize a single instance of the data stream, such as for a single-input single-output (SISO) communication format. The computing system 100 can further simultaneously utilize multiple instances of the data stream, such as for a multiple-input multiple-output (MIMO) communication format.

A transmission antenna count corresponding to a quantity of antennas used for transmitting each signal can be represented as 'M' for a specific device, for a specific signal, a specific instance of the data stream, or a combination thereof. A receiver antenna count corresponding to a quantity of antennas used for receiving each signal can be represented as 'N' for a specific device, for a specific signal, a specific instance of the data stream, or a combination thereof.

The computing system 100 can determine a channel measure based on the receiver signal 122. The channel measure can represent or characterize fading, distortions or alterations from delayed signals or echoes, or a combination thereof of one or more of the communication channels 120.

The channel measure can further represent a degradation, a loss, a change, a distortion, an alteration, or a combination thereof caused by traversing the one or more of the communication channels 120. For example, the computing system 100 can determine a serving channel measure 126, an interference channel measure 128, or a combination thereof at a device receiving the receiver signal 122.

The serving channel measure 126 can represent or characterize one or more instances of the communication channels 120 corresponding to the serving signal 116. The serving channel measure 126 can include a quantitate representation of the communication channels 120 between the intended transmitting device and the receiving device. For example, the serving channel measure 126 can represent the one or more instances of the communication channels 120 between the first node device 106 and the first user device 102.

Similarly, the interference channel measure 128 can represent or characterize one or more instances of the communication channels 120 corresponding to the interference signal 118. The interference channel measure 128 can include a quantitate representation of the communication channels 120 between the unintended transmitting device and the receiving device. For example, the interference channel measure 128 can represent the one or more instances of the communication channels 120 between the second node device 108 and the first user device 102, the second node device 108 intending to communicate with the second user device 104 and not the first user device 102.

The computing system 100 can determine the channel measure based on a variety of method. For example, the computing system 100 can utilize known or previously determined information regarding the communication channels 120, such as channel information or channel models predetermined by the computing system 100. Also for example, the computing system 100 or the receiving device therein can determine the channel measure based on a reference portion contained in transmitted signals.

The reference portion can include known or designated information transmitted by a device used to determine various types of information at a receiving device. The reference portion can include a bit, a symbol, a signal pattern, signal strength, frequency, phase, duration, or a combination thereof predetermined by the computing system 100, a standard, or a combination thereof.

The reference portion can be unique to each instance of transmitting device, intended receiver, a communication block, an instance of communication, a cell, or a combination thereof. The details of the reference portion can be known and used by one, multiple, or all devices in the computing system 100. For example, the receiving device can determine the channel estimate as a different between a known instance of the reference portion and received instance of the reference portion.

The computing system 100 can further determine properties, characteristics, or specific portions of the receiver signal 122. For example, the computing system 100 can determine a noise measure 130, a comprehensive signal measure 132, or a combination thereof.

The noise measure 130 can be a representation of an error or a deviation in the data included in the receiver signal 122. The noise measure 130 can represent the error or the deviation caused by a processing channel or a route for the data, hardware components processing signals, background noise, or a combination thereof. The noise measure 130 can also represent changes in the signal or the data due to hardware component limitations, such as tolerance levels or cross-talk between components. The noise measure 130 can be independent of the transmit symbols.

The noise measure 130 can represent the error or the deviation additive in nature and have a random Gaussian or Rayleigh distribution for the changes. The noise measure 130 can be colored or white. The noise measure 130 can further be based on a measure of the error or the deviation, such as deviation, covariance, power, spread, distancing, density, power, or a combination thereof for the error or the deviation.

The comprehensive signal measure 132 can represent is a representation or a characterization of the serving signal 116, the interference signal 118, the noise measure 130, or a combination thereof for a particular device. The comprehensive signal measure 132 can be represented as a ratio utilizing the serving signal 116, the interference signal 118, the noise measure 130, or a combination thereof. For example, the comprehensive signal measure 132 can include a signal-to-interference ratio (SIR), a signal-to-noise ratio (SNR), an interference-to-noise ratio (INR), a signal-to-interference-plus-noise ratio (SINR), or a combination thereof.

The computing system 100 can utilize a receiver description 134. The receiver description 134 is information representing the receiving device or the signal processing thereof. For example, the receiver description 134 can include identification of the interference-aware receiver 124, rank information, such as the transmission antenna count or the receiver antenna count, or a combination thereof processing the receiver signal 122.

Also for example, the receiver description 134 can include a channel feedback 136, a signal feedback 138, or a combination thereof. The channel feedback 136 is information describing one or more instance of the communication channels 120 perceived, experienced, or determined by the receiving device. As a more specific example, the channel feedback 136 can include the serving channel measure 126, the interference channel measure 128, or a combination thereof from the receiving device.

The channel feedback 136 can include complete channel knowledge. The channel feedback 136 can include information different from, more complete than, in addition to, or a combination thereof relative to channel quality information (CQI), acknowledgement, or a combination thereof.

The signal feedback 138 is information describing the receiver signal 122 or components therein at the receiving device. The signal feedback 138 can describe the serving signal 116, the interference signal 118, a portion in the receiver signal 122 corresponding thereto, or a combination thereof. For example, the signal feedback 138 can include power in the serving signal 116, power in the interference signal 118, power in a portion in the receiver signal 122 corresponding thereto, the comprehensive signal measure 132, or a combination thereof.

The receiver description 134 can be determined by the transmitting device, such as the first node device 106 or the second node device 108. For example, the receiver description 134 including the channel feedback 136, the signal feedback 138, or a combination thereof can be transmitted by the receiving device as feedback information and received by the transmitting device. As a more specific example, the first user device 102 receiving and processing the receiver signal 122 can communicate the receiver description 134 to the first node device 106.

The computing system 100 can include one or more metric for describing communication between devices. For example, the computing system 100 can include a serving communication capacity 140, an interference communication capacity 142, or a combination thereof.

The serving communication capacity 140 can represent a capability or an efficiency of communication processing for the serving signal 116. The serving communication capacity 140 can represent the capacity or the efficiency of the first user device 102, the first node device 106, or a combination thereof.

For example, the serving communication capacity 140 can include a speed or an amount of information exchanged between intended devices corresponding to the serving signal 116. The serving communication capacity 140 can characterize the speed or the amount for communication between the first user device 102 and the first node device 106. Also for example, the serving communication capacity 140 can describe a capacity for processing the interference signal 118 from the perspective of the first node device 106 using the interference-aware receiver 124 therein.

The interference communication capacity 142 can represent a capability or an efficiency of communication processing for the interference signal 118. The interference communication capacity 142 can represent the capacity or the efficiency of the second user device 104, the second node device 108, or a combination thereof.

For example, the interference communication capacity 142 can include a speed or an amount of information exchanged between intended devices corresponding to the interference signal 118. The interference communication capacity 142 can characterize the speed or the amount for communication between the second user device 104 and the second node device 108. Also for example, the interference communication capacity 142 can describe a capacity for processing unintended interferences from the perspective of the second node device 108 using the interference-aware receiver 124 therein.

For illustrative purposes, the computing system 100 is described for a receiver count 144 of two with the first user device 102 and the second user device 104. However, it is understood that the receiver count 144, represented as can be any number greater than two, with the computing system 100 including any number of receivers greater than two.

For the computing system 100, the receiver signal 122 can be represented as:

$$y_r = \sqrt{\rho_{ri}} H_{ri} w_i s_i + \Sigma_{j \neq i} \sqrt{\rho_{rj}} H_{rj} w_j s_j + n_r.$$  Equation (1).

The term '$y_r$' can represent the receiver signal 122 at the receiving device 'r', including the first user device 102. The various instances of the receiver signal 122 at each of the receivers can be represented as '$r=1, \ldots, K$'.

The serving channel measure 126 can be represented as '$H_{ri}$', including complex Gaussian channel matrix from interfering transmitter 'i' to the receiver 'r'. The serving signal 116 can be represented as '$s_i$'. The interference channel measure 128 can be represented as '$H_{rj}$', including complex Gaussian channel matrix from transmitter 'j' to the receiver 'r'. The interference signal 118 can be represented as '$s_j$'.

The computing system 100 can communicate between devices using a coordination pre-coding set 146, represented as 'W', including one or more instances of a pre-coding adjustment 148, represented as 'w'. The computing system 100 can further communicate between devices using a long-term measure 150, represented as '$\rho$'.

The pre-coding adjustment 148 is a method or a process for utilizing spatial and directional signal communication. The pre-coding adjustment 148 can include a factor or a value applied to the signal, assignment of portions of signal to antenna, or a combination thereof. The pre-coding adjustment 148 can be represented as a matrix, a vector, or a combination thereof.

The pre-coding adjustment 148 can correspond to a specific transmission, a specific message or a portion thereof, a specific transmitter, or a combination thereof. For example, serving signal 116 can include a unique instance of the pre-coding adjustment 148 applied to its instance of the content 112 or a derivative thereof for utilizing spatial and directional relationship between the first node device 106 and the first user device 102. Also for example, the interference signal 118 can include its own instance of the pre-coding adjustment 148 applied to its instance of the content 112 or a derivative thereof for utilizing spatial and directional relationship between the second node device 108 and the second user device 104.

The coordination pre-coding set 146 is a grouping of instances of the pre-coding adjustment 148. The coordination pre-coding set 146 can include instances of the pre-coding adjustment 148 for usage with simultaneous multiple communications. The coordination pre-coding set 146 can correspond to multiple antennas, multiple transmitters, multiple base stations or cells, or a combination thereof.

For example, the coordination pre-coding set 146 can include instances of the pre-coding adjustment 148 for use by multiple neighboring base stations or cells, such as including the first node device 106 and the second node device 108. Also for example, the coordination pre-coding set 146 can include instances of the pre-coding adjustment 148 intended for communication with receivers within a geographic region, according to the receiver count 144, overlapping multiple base stations or cells.

The computing system 100 can generate the coordination pre-coding set 146 and use the pre-coding adjustment 148 therein for the transmitter in communicating with devices. The computing system 100 can generate the coordination pre-coding set 146 based on coordinating the simultaneous communications.

The computing system 100 can include devices, such as the first node device 106 or the second node device 108, cooperating or sharing information to generate the coordination pre-coding set 146. The computing system 100 can include a coordinating or a scheduling device generating the coordination pre-coding set 146 for the transmitters. Details regarding the coordination pre-coding set 146 will be described below.

The long-term measure 150 is a representation of strength over a period of time. The long-term measure 150 can represent long-term SNR. The long-term measure 150 can represent channel power. The computing system 100 can identify or measure the long-term measure 150 based on the operational environment.

For illustrative purposes, the receiver signal 122 will be described as the signal received by the first user device 102. However, it is understood that the receiver signal 122 can represent the signal received by the first node device 106, the second user device 104, or the second node device 108.

For further illustrative purposes, the computing system 100 is described as the base station communicating information to the mobile device, such as the base station transmitting and the mobile device receiving the information. However, it is understood that the mobile device can communicate directly to each other or to the base station.

For further illustrative purposes, the computing system 100 is described as having one instance of the serving signal 116 and one instance of the interference signal 118 relative to communicating between the first user device 102 and the first node device 106. However, it is understood that the computing system 100 can experience and process for multiple interference signals and sources. The computing system 100 can coordinate the communication of signals with two or more instances of the base stations.

Figure 2:
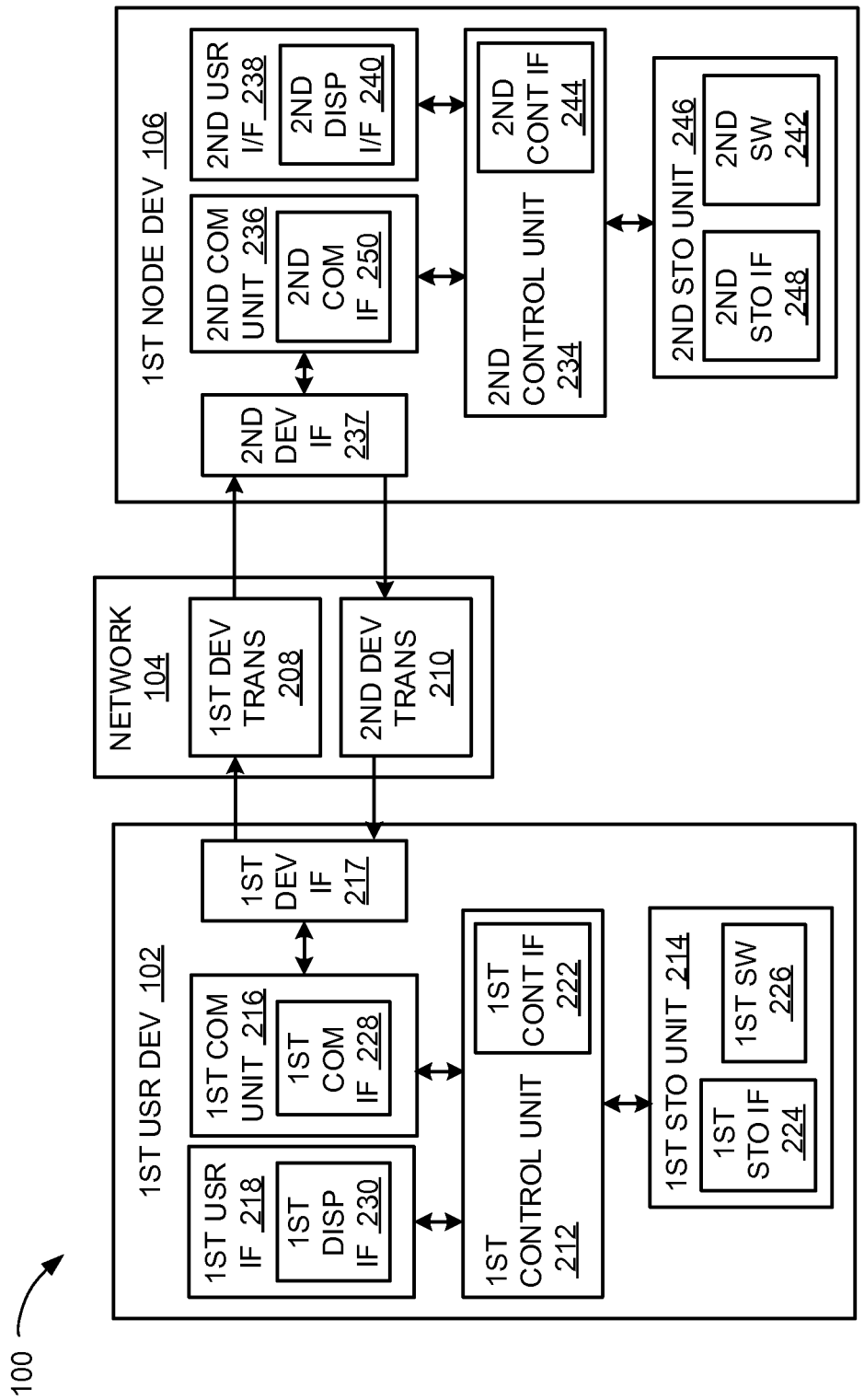
FIG. 2 is an exemplary block diagram of the computing system.

Referring now to FIG. 2, therein is shown an exemplary block diagram of the computing system 100. The computing system 100 can include the first user device 102, the network 110, and the first node device 106. The first user device 102 can send information in a first device transmission 208 over the network 110 to the first node device 106. The first node device 106 can send information in a second device transmission 210 over the network 110 to the first user device 102.

For illustrative purposes, the computing system 100 is shown with the first user device 102 as a client device, although it is understood that the computing system 100 can have the first user device 102 as a different type of device. For example, the first user device 102 can be a server having a display interface.

Also for illustrative purposes, the computing system 100 is shown with the first node device 106 as a server, although it is understood that the computing system 100 can have the first node device 106 as a different type of device. For example, the first node device 106 can be a client device.

For brevity of description in this embodiment of the present invention, the first user device 102 will be described as a client device and the first node device 106 will be described as a server device. The embodiment of the present invention is not limited to this selection for the type of devices. The selection is an example of an embodiment of the present invention.

The first user device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first user device 102. The first control interface 222 can also be used for communication that is external to the first user device 102.

The first control interface 222 can receive information from the other functional units or from external sources, or can transmit information to the other functional units or to external destinations. The external sources and the external destinations refer to sources and destinations external to the first user device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as nonvolatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first user device 102. The first storage interface 224 can also be used for communication that is external to the first user device 102.

The first storage interface 224 can receive information from the other functional units or from external sources, or can transmit information to the other functional units or to external destinations. The external sources and the external destinations refer to sources and destinations external to the first user device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first user device 102. For example, the first communication unit 216 can permit the first user device 102 to communicate with the first node device 106, a different device, an attachment, such as a peripheral device or a desktop computer, the network 110, or a combination thereof.

The first communication unit 216 can also function as a communication hub allowing the first user device 102 to function as part of the network 110 and not limited to be an end point or terminal unit to the network 110. The first communication unit 216 can include active and passive components, such as microelectronics or an antenna, for interaction with the network 110.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first inter-device interface 217. The first inter-device interface 217 can be a device or a portion of a device for physically communicating signals with a separate device. The first inter-device interface 217 can communicate by transmitting or receiving signals to or from another device. The first inter-device interface 217 can include one or more antennas for wireless signals, a physical connection and receiver-transmitter for wired signals, or a combination thereof. The first inter-device interface 217 can include an omnidirectional antenna, a wire, an antenna chip, a ceramic antenna, or a combination thereof. The first inter-device interface 217 can further include a port, a wire, a repeater, a connector, a filter, a sensor, or a combination thereof.

The first inter-device interface 217 can detect or respond to a power in electromagnetic waves and provide the detected result to the first communication unit 216 to receive a signal, including the second device transmission 210. The first inter-device interface 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first user device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first user device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the network 110 via the first communication unit 216.

The first node device 106 can be optimized for implementing an embodiment of the present invention in a multiple device embodiment with the first user device 102. The first node device 106 can provide the additional or higher performance processing power compared to the first user device 102. The first node device 106 can include a second control unit 234, a second communication unit 236, a second user interface 238, and a second storage unit 246.

The second user interface 238 allows a user (not shown) to interface and interact with the first node device 106. The second user interface 238 can include an input device and an output device. Examples of the input device of the second user interface 238 can include a keypad, a touchpad, softkeys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the first node device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first user device 102 over the network 110.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the first node device 106. The second control interface 244 can also be used for communication that is external to the first node device 106.

The second control interface 244 can receive information from the other functional units or from external sources, or can transmit information to the other functional units or to external destinations. The external sources and the external destinations refer to sources and destinations external to the first node device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the first node device 106. The second storage interface 248 can also be used for communication that is external to the first node device 106.

The second storage interface 248 can receive information from the other functional units or from external sources, or can transmit information to the other functional units or to external destinations. The external sources and the external destinations refer to sources and destinations external to the first node device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the first node device 106. For example, the second communication unit 236 can permit the first node device 106 to communicate with the first user device 102 over the network 110.

The second communication unit 236 can also function as a communication hub allowing the first node device 106 to function as part of the network 110 and not limited to be an end point or terminal unit to the network 110. The second communication unit 236 can include active and passive components, such as microelectronics or resistors, for interaction with the network 110.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second inter-device interface 237. The second inter-device interface 237 can be a device or a portion of a device for physically communicating signals with a separate device. The second inter-device interface 237 can communicate by transmitting or receiving signals to or from another device. The second inter-device interface 237 can include one or more antennas for wireless signals, a physical connection and receiver-transmitter for wired signals, or a combination thereof. The second inter-device interface 237 can include an omnidirectional antenna, a wire, an antenna chip, a ceramic antenna, or a combination thereof. The second inter-device interface 237 can further include a port, a wire, a repeater, a connector, a filter, a sensor, or a combination thereof.

The second inter-device interface 237 can detect or respond to a power in electromagnetic waves and provide the detected result to the second communication unit 236 to receive a signal, including the first device transmission 208. The second inter-device interface 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the first node device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 110 to send information to the first node device 106 in the first device transmission 208. The first node device 106 can receive information in the second communication unit 236 from the first device transmission 208 of the network 110.

The second communication unit 236 can couple with the network 110 to send information to the first user device 102 in the second device transmission 210. The first user device 102 can receive information in the first communication unit 216 from the second device transmission 210 of the network 110. The computing system 100 can be executed by the first control unit 212, the second control unit 234, or a combination thereof. For illustrative purposes, the first node device 106 is shown with the partition having the second user interface 238, the second storage unit 246, the second control unit 234, and the second communication unit 236, although it is understood that the first node device 106 can have a different partition. For example, the second software 242 can be partitioned differently such that some or all of its function can be in the second control unit 234 and the second communication unit 236. Also, the first node device 106 can include other functional units not shown in FIG. 2 for clarity.

The functional units in the first user device 102 can work individually and independently of the other functional units. The first user device 102 can work individually and independently from the first node device 106 and the network 110.

The functional units in the first node device 106 can work individually and independently of the other functional units. The first node device 106 can work individually and independently from the first user device 102 and the network 110.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first user device 102 and the first node device 106. It is understood that the first user device 102 and the first node device 106 can operate any of the modules and functions of the computing system 100.

Figure 3:
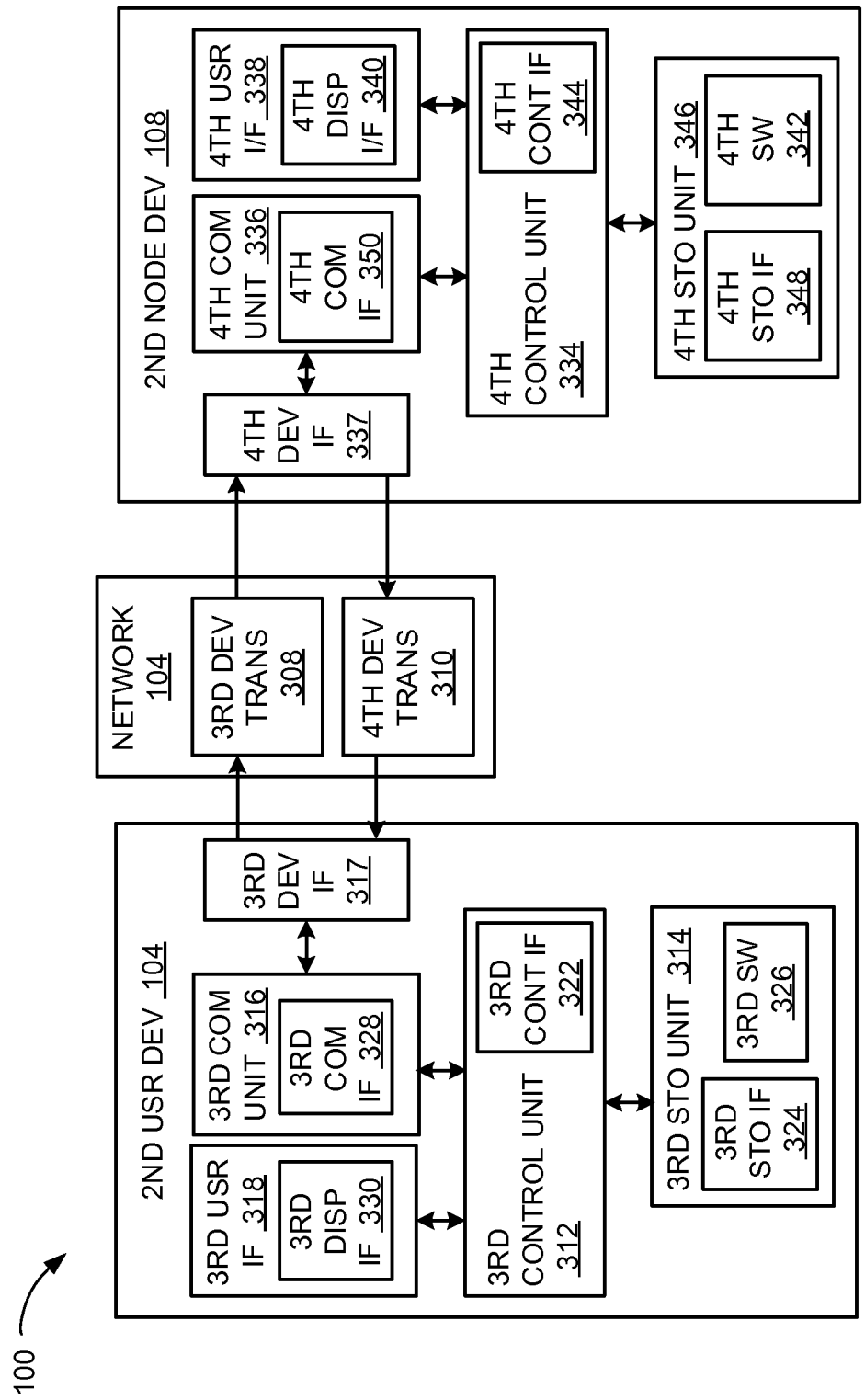
FIG. 3 is a further exemplary block diagram of the computing system.

Referring now to FIG. 3, therein is shown a further exemplary block diagram of the computing system 100. The computing system 100 can include the second user device 104, the network 110, and the second node device 108. The second user device 104 can send information in a third device transmission 308 over the network 110 to the second node device 108. The second node device 108 can send information in a fourth device transmission 310 over the network 110 to the second user device 104.

For illustrative purposes, the computing system 100 is shown with the second user device 104 as a client device, although it is understood that the computing system 100 can have the second user device 104 as a different type of device. For example, the second user device 104 can be a server having a display interface.

Also for illustrative purposes, the computing system 100 is shown with the second node device 108 as a server, although it is understood that the computing system 100 can have the second node device 108 as a different type of device. For example, the second node device 108 can be a client device.

For brevity of description in this embodiment of the present invention, the second user device 104 will be described as a client device and the second node device 108 will be described as a server device. The embodiment of the present invention is not limited to this selection for the type of devices. The selection is an example of an embodiment of the present invention.

The second user device 104 can include a third control unit 312, a third storage unit 314, a third communication unit 316, and a third user interface 318. The third control unit 312 can include a third control interface 322. The third control unit 312 can execute a third software 326 to provide the intelligence of the computing system 100.

The third control unit 312 can be implemented in a number of different manners. For example, the third control unit 312 can be a processor, an ASIC, an embedded processor, a microprocessor, a hardware control logic, a hardware FSM, a DSP, or a combination thereof. The third control interface 322 can be used for communication between the third control unit 312 and other functional units in the second user device 104. The third control interface 322 can also be used for communication that is external to the second user device 104.

The third control interface 322 can receive information from the other functional units or from external sources, or can transmit information to the other functional units or to external destinations. The external sources and the external destinations refer to sources and destinations external to the second user device 104.

The third control interface 322 can be implemented in different ways and can include different implementations depending on which functional units or external units are being interfaced with the third control interface 322. For example, the third control interface 322 can be implemented with a pressure sensor, an inertial sensor, a microelectromechanical system (MEMS), optical circuitry, waveguides, wireless circuitry, wireline circuitry, or a combination thereof.

The third storage unit 314 can store the third software 326. The third storage unit 314 can also store the relevant information, such as data representing incoming images, data representing previously presented image, sound files, or a combination thereof.

The third storage unit 314 can be a volatile memory, a nonvolatile memory, an internal memory, an external memory, or a combination thereof. For example, the third storage unit 314 can be a nonvolatile storage such as NVRAM, Flash memory, disk storage, or a volatile storage such as SRAM.

The third storage unit 314 can include a third storage interface 324. The third storage interface 324 can be used for communication between the third storage unit 314 and other functional units in the second user device 104. The third storage interface 324 can also be used for communication that is external to the second user device 104.

The third storage interface 324 can receive information from the other functional units or from external sources, or can transmit information to the other functional units or to external destinations. The external sources and the external destinations refer to sources and destinations external to the second user device 104.

The third storage interface 324 can include different implementations depending on which functional units or external units are being interfaced with the third storage unit 314. The third storage interface 324 can be implemented with technologies and techniques similar to the implementation of the third control interface 322.

The third communication unit 316 can enable external communication to and from the second user device 104. For example, the third communication unit 316 can permit the second user device 104 to communicate with the second node device 108, a different device, an attachment, such as a peripheral device or a desktop computer, the network 110, or a combination thereof.

The third communication unit 316 can also function as a communication hub allowing the second user device 104 to function as part of the network 110 and not limited to be an end point or terminal unit to the network 110. The third communication unit 316 can include active and passive components, such as microelectronics or an antenna, for interaction with the network 110.

The third communication unit 316 can include a baseband device or component, a modem, a digital signal processor, or a combination thereof for transmitting, formatting, receiving, detecting, decoding, further processing, or a combination thereof for communication signals. The third communication unit 316 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 316 can further include one or more portions for storing information, such as cache or RAM memory, registers, or a combination thereof.

The third communication unit 316 can be coupled with a third inter-device interface 317. The third inter-device interface 317 can be a device or a portion of a device for physically communicating signals with a separate device. The third inter-device interface 317 can communicate by transmitting or receiving signals to or from another device. The third inter-device interface 317 can include one or more antennas for wireless signals, a physical connection and receiver-transmitter for wired signals, or a combination thereof. The third inter-device interface 317 can include an omnidirectional antenna, a wire, an antenna chip, a ceramic antenna, or a combination thereof. The third inter-device interface 317 can further include a port, a wire, a repeater, a connector, a filter, a sensor, or a combination thereof.

The third inter-device interface 317 can detect or respond to a power in electromagnetic waves and provide the detected result to the third communication unit 316 to receive a signal, including the fourth device transmission 310. The third inter-device interface 317 can provide a path or respond to currents or voltages provided by the third communication unit 316 to transmit a signal, including the third device transmission 308.

The third communication unit 316 can include a third communication interface 328. The third communication interface 328 can be used for communication between the third communication unit 316 and other functional units in the second user device 104. The third communication interface 328 can receive information from the other functional units or can transmit information to the other functional units.

The third communication interface 328 can include different implementations depending on which functional units are being interfaced with the third communication unit 316. The third communication interface 328 can be implemented with technologies and techniques similar to the implementation of the third control interface 322.

The third user interface 318 allows a user (not shown) to interface and interact with the second user device 104. The third user interface 318 can include an input device and an output device. Examples of the input device of the third user interface 318 can include a keypad, a touchpad, soft-keys, a keyboard, a microphone, an infrared sensor for receiving remote signals, or any combination thereof to provide data and communication inputs.

The third user interface 318 can include a third display interface 330. The third display interface 330 can include an output device. The third display interface 330 can include a display, a projector, a video screen, a speaker, or any combination thereof.

The third control unit 312 can operate the third user interface 318 to display information generated by the computing system 100. The third control unit 312 can also execute the third software 326 for the other functions of the computing system 100. The third control unit 312 can further execute the third software 326 for interaction with the network 110 via the third communication unit 316.

The second node device 108 can be optimized for implementing an embodiment of the present invention in a multiple device embodiment with the second user device 104. The second node device 108 can provide the additional or higher performance processing power compared to the second user device 104. The second node device 108 can include a fourth control unit 334, a fourth communication unit 336, a fourth user interface 338, and a fourth storage unit 346.

The fourth user interface 338 allows a user (not shown) to interface and interact with the second node device 108. The fourth user interface 338 can include an input device and an output device. Examples of the input device of the fourth user interface 338 can include a keypad, a touchpad, soft-keys, a keyboard, a microphone, or any combination thereof to provide data and communication inputs. Examples of the output device of the fourth user interface 338 can include a fourth display interface 340. The fourth display interface 340 can include a display, a projector, a video screen, a speaker, or any combination thereof.

The fourth control unit 334 can execute a fourth software 342 to provide the intelligence of the second node device 108 of the computing system 100. The fourth software 342 can operate in conjunction with the third software 326. The fourth control unit 334 can provide additional performance compared to the third control unit 312.

The fourth control unit 334 can operate the fourth user interface 338 to display information. The fourth control unit 334 can also execute the fourth software 342 for the other functions of the computing system 100, including operating the fourth communication unit 336 to communicate with the second user device 104 over the network 110.

The fourth control unit 334 can be implemented in a number of different manners. For example, the fourth control unit 334 can be a processor, an embedded processor, a microprocessor, hardware control logic, a hardware FSM, a DSP, or a combination thereof.

The fourth control unit 334 can include a fourth control interface 344. The fourth control interface 344 can be used for communication between the fourth control unit 334 and other functional units in the second node device 108. The fourth control interface 344 can also be used for communication that is external to the second node device 108.

The fourth control interface 344 can receive information from the other functional units or from external sources, or can transmit information to the other functional units or to external destinations. The external sources and the external destinations refer to sources and destinations external to the second node device 108.

The fourth control interface 344 can be implemented in different ways and can include different implementations depending on which functional units or external units are being interfaced with the fourth control interface 344. For example, the fourth control interface 344 can be implemented with a pressure sensor, an inertial sensor, a microelectromechanical system (MEMS), optical circuitry, waveguides, wireless circuitry, wireline circuitry, or a combination thereof.

A fourth storage unit 346 can store the fourth software 342. The fourth storage unit 346 can also store the information such as data representing incoming images, data representing previously presented image, sound files, or a combination thereof. The fourth storage unit 346 can be sized to provide the additional storage capacity to supplement the third storage unit 314.

For illustrative purposes, the fourth storage unit 346 is shown as a single element, although it is understood that the fourth storage unit 346 can be a distribution of storage elements. Also for illustrative purposes, the computing system 100 is shown with the fourth storage unit 346 as a single hierarchy storage system, although it is understood that the computing system 100 can have the fourth storage unit 346 in a different configuration. For example, the fourth storage unit 346 can be formed with different storage technologies forming a memory hierarchal system including different levels of caching, main memory, rotating media, or off-line storage.

The fourth storage unit 346 can be a volatile memory, a nonvolatile memory, an internal memory, an external memory, or a combination thereof. For example, the fourth storage unit 346 can be a nonvolatile storage such as NVRAM, Flash memory, disk storage, or a volatile storage such as SRAM.

The fourth storage unit 346 can include a fourth storage interface 348. The fourth storage interface 348 can be used for communication between the fourth storage unit 346 and other functional units in the second node device 108. The fourth storage interface 348 can also be used for communication that is external to the second node device 108.

The fourth storage interface 348 can receive information from the other functional units or from external sources, or can transmit information to the other functional units or to external destinations. The external sources and the external destinations refer to sources and destinations external to the second node device 108.

The fourth storage interface 348 can include different implementations depending on which functional units or external units are being interfaced with the fourth storage unit 346. The fourth storage interface 348 can be implemented with technologies and techniques similar to the implementation of the fourth control interface 344.

The fourth communication unit 336 can enable external communication to and from the second node device 108. For example, the fourth communication unit 336 can permit the second node device 108 to communicate with the second user device 104 over the network 110.

The fourth communication unit 336 can also function as a communication hub allowing the second node device 108 to function as part of the network 110 and not limited to be an end point or terminal unit to the network 110. The fourth communication unit 336 can include active and passive components, such as microelectronics or resistors, for interaction with the network 110.

The fourth communication unit 336 can include a baseband device or component, a modem, a digital signal processor, or a combination thereof for transmitting, formatting, receiving, detecting, decoding, further processing, or a combination thereof for communication signals. The fourth communication unit 336 can include one or more portions for processing the voltages, the currents, the digital information, or a combination thereof, such as an analog-to-digital converter, a digital-to-analog converter, a filter, an amplifier, a processor-type circuitry, or a combination thereof. The fourth communication unit 336 can further include one or more portions for storing information, such as cache or RAM memory, registers, or a combination thereof.

The fourth communication unit 336 can be coupled with a fourth inter-device interface 337. The fourth inter-device interface 337 can be a device or a portion of a device for physically communicating signals with a separate device. The fourth inter-device interface 337 can communicate by transmitting or receiving signals to or from another device. The fourth inter-device interface 337 can include one or more antennas for wireless signals, a physical connection and receiver-transmitter for wired signals, or a combination thereof. The fourth inter-device interface 337 can include an omnidirectional antenna, a wire, an antenna chip, a ceramic antenna, or a combination thereof. The fourth inter-device interface 337 can further include a port, a wire, a repeater, a connector, a filter, a sensor, or a combination thereof.

The fourth inter-device interface 337 can detect or respond to a power in electromagnetic waves and provide the detected result to the fourth communication unit 336 to receive a signal, including the third device transmission 308. The fourth inter-device interface 337 can provide a path or respond to currents or voltages provided by the fourth communication unit 336 to transmit a signal, including the fourth device transmission 310.

The fourth communication unit 336 can include a fourth communication interface 350. The fourth communication interface 350 can be used for communication between the fourth communication unit 336 and other functional units in the second node device 108. The fourth communication interface 350 can receive information from the other functional units or can transmit information to the other functional units.

The fourth communication interface 350 can include different implementations depending on which functional units are being interfaced with the fourth communication unit 336. The fourth communication interface 350 can be implemented with technologies and techniques similar to the implementation of the fourth control interface 344.

The third communication unit 316 can couple with the network 110 to send information to the second node device 108 in the third device transmission 308. The second node device 108 can receive information in the fourth communication unit 336 from the third device transmission 308 of the network 110.

The fourth communication unit 336 can couple with the network 110 to send information to the second user device 104 in the fourth device transmission 310. The second user device 104 can receive information in the third communication unit 316 from the fourth device transmission 310 of the network 110. The computing system 100 can be executed by the third control unit 312, the fourth control unit 334, or a combination thereof. For illustrative purposes, the second node device 108 is shown with the partition having the fourth user interface 338, the fourth storage unit 346, the fourth control unit 334, and the fourth communication unit 336, although it is understood that the second node device 108 can have a different partition. For example, the fourth software 342 can be partitioned differently such that some or all of its function can be in the fourth control unit 334 and the fourth communication unit 336. Also, the second node device 108 can include other functional units not shown in FIG. 3 for clarity.

The functional units in the second user device 104 can work individually and independently of the other functional units. The second user device 104 can work individually and independently from the second node device 108 and the network 110.

The functional units in the second node device 108 can work individually and independently of the other functional units. The second node device 108 can work individually and independently from the second user device 104 and the network 110.

The functional units described above can be implemented in hardware. For example, one or more of the functional units can be implemented using the a gate, circuitry, a processor, a computer, integrated circuit, integrated circuit cores, a pressure sensor, an inertial sensor, a MEMS, a passive device, a physical non-transitory memory medium having instructions for performing the software function, a portion therein, or a combination thereof.

For illustrative purposes, the computing system 100 is described by operation of the second user device 104 and the second node device 108. It is understood that the second user device 104 and the second node device 108 can operate any of the modules and functions of the computing system 100.

Figure 4:
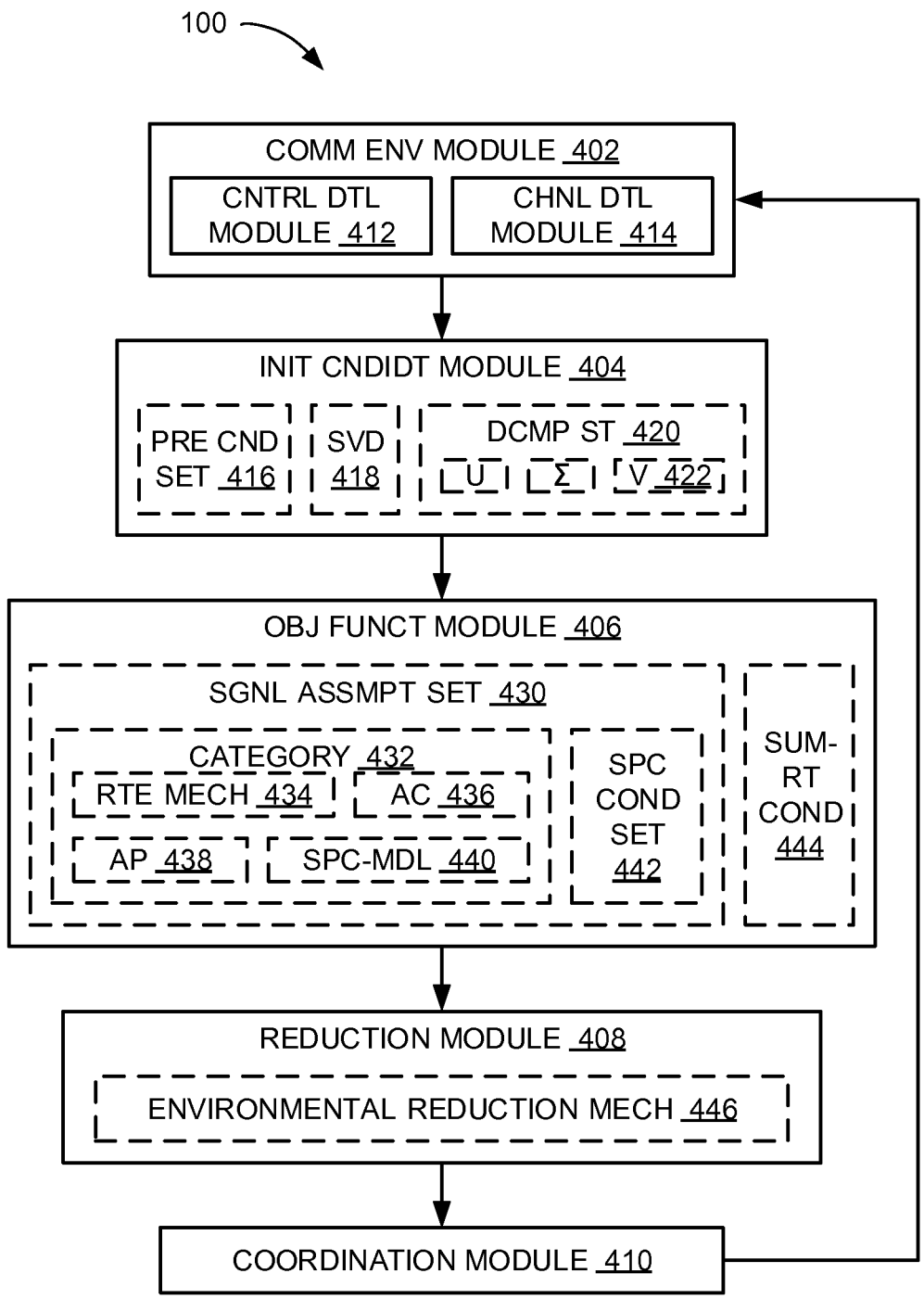
FIG. 4 is a control flow of the computing system.

Referring now to FIG. 4, therein is shown a control flow of the computing system 100. The computing system 100 can include a communication environment module 402, an initial candidate module 404, an object function module 406, a reduction module 408, a coordination module 410, or a combination thereof.

The communication environment module 402 can be coupled with initial candidate module 404, which can be further coupled with the object function module 406. The object function module 406 can be coupled with the coordination module 410, which can be further coupled with the communication environment module 402.

The modules can be coupled to each other in a variety of ways. For example, modules can be coupled by having the input of one module connected to the output of another, such as by using wired or wireless connections, the network 110 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the communication environment module 402 can be connected to one or more inputs or inputs of the initial candidate module 404 using conductors or the transmission channel without intervening modules or devices there-between. Also for example, the communication environment module 402 can be coupled to the initial candidate module 404 indirectly using a wireless channel with a repeater, a switch, a routing device, or a combination thereof. The initial candidate module 404, the object function module 406, the reduction module 408, the coordination module 410, or a combination thereof can be coupled in similar ways.

The computing system 100 can communicate information between devices, such as by sending, transmitting, receiving, coding, decoding, or a combination thereof. The receiving device can further communicate with the user by displaying images, recreating sounds, exchanging process steps or instructions, or a combination thereof according to the information communicate to the device.

The communication environment module 402 is configured to determine information regarding communication between devices. The communication environment module 402 can determine information for representing the receiver signal 122 of FIG. 1, devices communicating the receiver signal 122, or a combination thereof. For example, the communication environment module 402 can determine information regarding transmitting device, receiving device, the communication channels 120 of FIG. 1, or a combination thereof.

As a more specific example, the communication environment module 402 can determine the receiver description 134 of FIG. 1, layer information, the transmission antenna count, the receiver antenna count, the receiver count 144 of FIG. 1, the serving communication capacity 140 of FIG. 1, the interference communication capacity 142 of FIG. 1, the long-term measure 150 of FIG. 1, or a combination thereof. Also as a more specific example, the communication environment module 402 can determine information with respect to the first node device 106 of FIG. 1, the second node device 108 of FIG. 1, the first user device 102 of FIG. 1, the second user device 104 of FIG. 1, any other device in the computing system 100, or a combination thereof.

As a more detailed example, the communication environment module 402 can determine the receiver description 134 for representing the receiver signal 122. The communication environment module 402 can determine the receiver description 134 for the receiver signal 122 corresponding to the serving signal 116 contemporaneous with the interference signal 118 from the second node device 108 acting as an interference source.

Continuing with the example, the communication environment module 402 can determine the receiver description 134 by determining information about the receiving device, such as existence of the interference-aware receiver 124 of FIG. 1, such as for the first user device 102 or the second user device 104. The communication environment module 402 can further determine the receiver description 134 by determining information at or from perspective of the receiver.

Continuing with the example, the communication environment module 402 can receive the receiver-determined information at the node device or the scheduling device as the receiver description 134 feeding back from the receivers. The communication environment module 402 can include a control detail module 412, a channel detail module 414, or a combination thereof for determining the receiver description 134.

The control detail module 412 is configured to determine information regarding devices for communication. For example, the control detail module 412 can determine information regarding the first node device 106, the second node device 108, the first user device 102, the second user device 104, or a combination thereof.

As a more specific example, the control detail module 412 can determine the receiver count 144, the layer information, the transmission antenna count, the receiver antenna count, or a combination thereof for the receiver description 134. As a more specific example, the control detail module 412 can determine the device as including the interference-aware receiver 124 for the receiver description 134.

The control detail module 412 can determine device information by accessing stored information using the first storage interface 224 of FIG. 2, the second storage interface 248 of FIG. 2, the third storage interface 324 of FIG. 3, the fourth storage interface 348 of FIG. 3, or a combination thereof. The control detail module 412 can further determine device information by accessing through the first communication interface 228 of FIG. 2, the second communication interface 250 of FIG. 2, the third communication interface 328 of FIG. 3, the fourth communication interface 350 of FIG. 3, or a combination thereof.

The channel detail module 414 is configured to determine the receiver description 134 corresponding to the receiver signal 122. The channel detail module 414 can determine the receiver description 134 including the channel feedback 136 of FIG. 1, the signal feedback 138 of FIG. 1, or a combination thereof.

The channel detail module 414 can determine the receiver description 134 in a variety of ways. For example, the channel detail module 414 can determine the receiver description 134 by determining the serving channel measure 126, the interference channel measure 128, or a combination thereof at the receiving device, such as the first user device 102 or the second user device 104. The channel detail module 414 can further communicate the channel measure as the channel feedback 136 with the node device, such as the first node device 106 or the second node device 108, coordinating device, such as within the first node device 106 or coupled through the node link 114 of FIG. 1, or a combination thereof.

Also for example, the channel detail module 414 can determine the receiver description 134 by determining signal power corresponding to the serving signal 116 or the interference signal 118, the noise measure 130, the comprehensive signal measure 132, the long-term measure 150, or a combination thereof for representing the serving signal 116, the interference signal 118, the channel feedback 136, or a combination thereof at the receiving device. The channel detail module 414 can similarly share the comprehensive signal measure 132, the long-term measure 150, or a combination thereof with the node device.

Also for example, the channel detail module 414 can determine the receiver description 134 by receiving the channel feedback 136, the signal feedback 138, or a combination thereof at the node device or at the coordinating device from the receiving device. As a more specific example, the transmitting devices can receive complete channel information, SIR, SNR, SINR, or a combination thereof at the interference-aware receiver 124 as feedback information therefrom.

The channel detail module 414 can use the first device interface 217 of FIG. 2, the second device interface 237 of FIG. 2, the third device interface 317 of FIG. 3, the fourth device interface 337 of FIG. 3, or a combination thereof to communicate the receiver description 134. The channel detail module 414 can further use the first control unit 212 of FIG. 2, the second control unit 234 of FIG. 2, the third control unit 312 of FIG. 3, the fourth control unit 334 of FIG. 3, the first communication unit 216 of FIG. 2, the second communication unit 236 of FIG. 2, the third communication unit 316 of FIG. 3, the fourth communication unit 336 of FIG. 3, or a combination thereof to determine the receiver description 134. The channel detail module 414 can further store the receiver description 134 in the first storage unit 214 of FIG. 2, the second storage unit 246 of FIG. 2, the third storage unit 314 of FIG. 3, the fourth storage unit 346 of FIG. 3, the first communication unit 216, the second communication unit 236, the third communication unit 316, the fourth communication unit 336, or a combination thereof.

After determining the receiver description 134, the control flow can pass to the initial candidate module 404. The control flow can pass through a variety of ways. For example, control flow can pass by having processing results of one module passed to another module, such as by passing the receiver description 134 from the communication environment module 402 to the initial candidate module 404, by storing the processing results at a location known and accessible to the other module, such as by storing the receiver description 134 at a storage location known and accessible to the initial candidate module 404, by notifying the other module, such as by using a flag, an interrupt, a status signal, or a combination for the initial candidate module 404, or a combination of processes thereof.

The initial candidate module 404 is configured to generate a finite set of possibilities considered for generating the coordination pre-coding set 146 of FIG. 1, the pre-coding adjustment 148 of FIG. 1 therein, or a combination thereof. The initial candidate module 404 can generate the finite set by generating a pre-coding candidate set 416.

The pre-coding candidate set 416 is a limited quantity of possibilities to be considered in generating the coordination pre-coding set 146, the pre-coding adjustment 148 therein, or a combination thereof. The initial candidate module 404 can generate the pre-coding candidate set 416 based on the receiver description 134 for adjusting the serving signal 116, the interference signal 118, a subsequent instance thereof, or a combination thereof.

The initial candidate module 404 can generate the pre-coding candidate set 416 using a singular-value decomposition (SVD) mechanism 418. The singular-value decomposition mechanism 418 can include a method or a process for performing factorization of a set of values. The singular-value decomposition mechanism 418 can be for performing the factorization of a real or complex matrix.

The initial candidate module 404 can use the singular-value decomposition mechanism 418 with the receiver description 134. The initial candidate module 404 can use the singular-value decomposition mechanism 418 to perform the factorization of the receiver description 134. For example, the initial candidate module 404 can use the singular-value decomposition mechanism 418 to perform the factorization of the channel measure, such as the serving channel measure 126, the interference channel measure 128, or a combination thereof, as represented by the channel feedback 136.

The initial candidate module 404 can calculate a decomposition output set 420 based on the singular-value decomposition mechanism 418 and the channel feedback 136. The decomposition output set 420 can include a group of parameters resulting from the factorization process.

For example, the decomposition output set 420 can include three parameters, a left-hand output, a center output, a right-hand output 422, or a combination thereof. The decomposition output set 420 can be represented as:

$$H_{ji} = U_{ji} \Sigma_{ji} V_{ji}.$$  Equation (2).

The serving channel measure 126, the interference channel measure 128, or a combination thereof, as represented by the channel feedback 136 can be represented as '$H_{ji}$'. The decomposition output set 420 can represent the right-hand side of Equation (2), with the left-hand output for singular matrix represented as '$U_{ji}$', the center output for singular matrix represented as '$\Sigma_{ji}$', and the right-hand output 422 for singular matrix represented as '$V_{ji}$'. Each diagonal element of the center output can correspond to the singular values of the channel feedback 136.

The initial candidate module 404 can generate the pre-coding candidate set 416 based on the decomposition output set 420. For example, the initial candidate module 404 can generate the pre-coding candidate set 416 based on one or more components of the decomposition output set 420.

As a more specific example, the initial candidate module 404 can generate the pre-coding candidate set 416 as the left-hand output, the center output, the right-hand output 422, a column vector therein, or a combination thereof. Also as a more specific example, the initial candidate module 404 can generate the pre-coding candidate set 416 as a set of all possible column vectors of the left, center, right, or a combination thereof for singular matrices of each channel matrix for each transmitter.

As a further specific example, the initial candidate module 404 can generate the pre-coding candidate set 416 based on:

$$\mathfrak{E} = \{\{v_k\}_{k=1}^{K|v_{i \in Vji, Hji = Uji \Sigma_{ji} Vji} \forall_{i,j}}\}.$$  Equation (3).

The pre-coding candidate set 416 can be represented as '$\mathfrak{E}$'. The right-hand output 422 can be represented as '$v_i$' or '$V_{ji}$'. The pre-coding candidate set 416 can include a collection of the right-hand output 422 corresponding to each instance of the serving channel measure 126, the interference channel measure 128, or a combination thereof.

It has been discovered that the pre-coding candidate set 416 based on the singular-value decomposition mechanism 418 provides reduced complexity and increase throughput. The finite set of possible values logically based on the channel matrices can be reduced, tested, optimized, or a combination thereof to reduce complexity in generating the pre-coding adjustment 148 or the coordination pre-coding set 146. Further, the pre-coding adjustment 148 or the coordination pre-coding set 146 resulting from logically reducing, testing, optimizing, or a combination thereof for the pre-coding candidate set 416 can minimize negative effects of interference between signals to increase throughput.

The initial candidate module 404 can use the first control unit 212, the second control unit 234, the third control unit 312, the fourth control unit 334, the first communication unit 216, the second communication unit 236, the third communication unit 316, the fourth communication unit 336, or a combination thereof to generate the pre-coding candidate set 416. The initial candidate module 404 can store the pre-coding candidate set 416 in the first communication unit 216, the second communication unit 236, the third communication unit 316, the fourth communication unit 336, the first storage unit 214, the second storage unit 246, the third storage unit 314, the fourth storage unit 346, or a combination thereof.

After generating the pre-coding candidate set 416, the control flow can be passed from the initial candidate module 404 to the object function module 406. The control flow can pass similarly as described above between the communication environment module 402 and the initial candidate module 404 but using processing results of the initial candidate module 404, such as the pre-coding candidate set 416.

The object function module 406 is configured to determine criteria for generating the coordination pre-coding set 146 or the pre-coding adjustment 148. The object function module 406 can determine the criteria by generating a signaling assumption set 430 describing possible environments for communication for the computing system 100.

The signaling assumption set 430 is a grouping of descriptions for possible environments for communication within the computing system 100. The signaling assumption set 430 can be based on various capabilities of the corresponding devices for communication, such as the first node device 106, the second node device 108, the first user device 102, the second user device 104, or a combination thereof.

The signaling assumption set 430 can represent the first user device 102 corresponding to the receiver signal 122, the second user device 104 intended for the interference signal 118, or a combination thereof. The signaling assumption set 430 can be based on the receiver description 134. For example, the signaling assumption set 430 can be based on existence of the interference-aware receiver 124, the rank information such as for the transmitter antenna count or the receiver antenna count, the receiver count 144, or a combination thereof.

The signaling assumption set 430 can include assumption categories 432 each including an assumption rate mechanism 434. The assumption categories 432 are each representations of unique environment possible for communication. The assumption categories 432 can represent unique combination of devices, capabilities, situations or scenarios, or a combination thereof for communicating signals.

The assumption rate mechanism 434 is a method or a process for determining communication capacity for a specific set of conditions. For example, the assumption rate mechanism 434 can include the method or the process for calculating or selecting the serving communication capacity 140, the interference communication capacity 142, or a combination thereof. As a more specific example, the assumption rate mechanism 434 can include an equation, a look-up table, or a combination thereof.

The object function module 406 can generate the signaling assumption set 430 further including a threshold profile associated with the assumption categories 432. The object function module 406 can include values predetermined by the computing system 100 associated with various parameters for selecting each instance of the assumption categories 432.

For example, the object function module 406 can generate the signaling assumption set 430 including the threshold profile based on the comprehensive signal measure 132, the long-term measure 150, or a combination thereof. The threshold profile can include a long-term threshold corresponding to the long-term measure 150, the signal measure threshold corresponding to the comprehensive signal measure 132, or a combination thereof.

As a detailed example, the computing system 100 can generate the signaling assumption set 430 including the assumption categories 432 of an all-common setting 436, an all-private setting 438, a specific-model setting 440, or a combination thereof corresponding to decomposing transmit messages into common part, private part, or a combination thereof. The specific-model setting 440 is a method or a mechanism for decomposing the serving signal 116, the interference signal 118, or a combination thereof into both common and private parts.

For example, the specific-model setting 440 can assume that the private message is decoded after all the common messages are decoded. As such, only the private messages transmitted from interfering transmitters can remain without being decoded for the specific-model setting 440. Also for example, the specific-model setting 440 can be based on specific methods, such as Etkin-Tse-Wang (ETW) method.

The all-common setting 436 is a method or a mechanism unified as treating all messages as common. For example, the all-common setting 436 can be based on the interference-aware receiver 124 or a capability thereof at a threshold amount of receivers or all applicable instances of the receivers. Also for example, the all-common setting 436 can be based on the receiving device decoding the interference signal 118.

The all-private setting 438 is a method or a mechanism unified as treating all messages as private. For example, the all-private setting 438 can be based on lack of the interference-aware receiver 124 or a deficient capability thereof at the threshold amount of receivers or all applicable instances of the receivers. Also for example, the all-private setting 438 can be based on the receiving device not decoding the interference signal 118 but treating as noise.

The all-private setting 438 can represent signaling scheme in which every receiver treats all interferences as noise. The all-common setting 436 can represent the signaling scheme in which every receiver can decode signals from all transmitters. The specific-model setting 440 can represent the signaling scheme between the all-private setting 438 and the all-common setting 436. For example, the specific-model setting 440 can represent only some receivers decoding interference signals, some or all receivers decoding some of the interference signals, only some receivers treating interference as noise, or a combination thereof.

Continuing with the detailed example, the specific-model setting 440 can include the assumption rate mechanism 434 represented as:

$$R_{sum}^{ETW} = \sum_{i=1}^{K} R_i^{ETW} = \sum_{i=1}^{K}(R_{p,i}^{ETW} + R_{c,i}^{ETW}).$$ Equation (4).

$$R_{p,i}^{ETW} = \log|\mathfrak{H}_1| - \log\left|I + \sum_{j \neq i} h_{ij}h_{ij}^\dagger\right|.$$ Equation (5).

$$\mathfrak{H}_1 = I + \sum_{j \neq i} h_{ij}h_{ij}^\dagger + \rho^{1-\alpha} h_{ii}h_{ii}^\dagger.$$ Equation (6).

$$R_{c,i}^{ETW} = \min_{\forall k, S} R_{c,kS}^{ETW}, \; S = S_i \cup S_{-i}.$$ Equation (7).

$$R_{c,iS}^{ETW} = \log\left|I + \mathfrak{H}_1^{-1} \sum_{k \in S} P_{ck}^{ETW} h_{ik}h_{ik}^\dagger\right|.$$ Equation (8).

$$P_{ck}^{ETW} = \begin{cases} \rho^\alpha - 1 & \text{if } k \neq i \\ \rho - \rho^{1-\alpha} & \text{if } k = i \end{cases}.$$ Equation (9).

The term '$h_{ij}$' can represent the interference channel measure 128 or a derivative thereof. The term '$h_{ii}$' can represent the serving channel measure 126. The term '$\alpha$' can be a constant to determine a ratio for the comprehensive signal measure 132, such as for $$\alpha = \frac{\log INR}{\log SNR}.$$

The term '$\rho$' can represent the SNR with '$\rho^\alpha$' representing INR. The term 'S' can represent common messages with '$\forall S \subseteq \{1, 2, \ldots, K\}$'.

The all-common setting 436 can include the assumption rate mechanism 434 represented as:

$$R_{sum}^{AC} = \sum_{t=1}^{K} R_i^{AC} = \sum_{i=1}^{K} R_{c,i}^{AC}.$$ Equation (10).

$$R_{c,i}^{AC} = \min_{\forall k, S} R_{c,kS}^{AC}, \; S = S_i \cup S_{-i}.$$ Equation (11).

$$R_{c,iS}^{AC} = \log\left|I + + \sum_{k \in S} P_{ck}^{AC} h_{ik}h_{ik}^\dagger\right|.$$ Equation (12).

$$P_{ck}^{AC} = \begin{cases} \rho^\alpha & \text{if } k \neq i \\ \rho & \text{if } k = i \end{cases}.$$ Equation (13).

The term '$R_i^{AC}$' can represent individual rate for the i-th instance of the receiving device, such as the first user device 102 or the second user device 104.

The all-private setting 438 can include the assumption rate mechanism 434 represented as:

$$R_{sum}^{AP} = \sum_{i=1}^{K} R_i^{AP} = \sum_{i=1}^{K} R_{p,i}^{AP}.$$ Equation (14).

$$R_{p,i}^{AP} = \log|I + (I + \sum_{j \neq i}\rho^\alpha h_{ij}h_{ij}^\dagger)^{-1} \rho h_{ii}h_{ii}^\dagger|.$$ Equation (15).

The term '$R_i^{AP}$' can represent individual rate for the i-th instance of the receiving device, such as the first user device 102 or the second user device 104.

The object function module 406 can determine a sum-rate condition 444 based on the signaling assumption set 430. The sum-rate condition 444 is a representation of the serving signal 116 along with the interference signal 118 for simultaneous communication. The sum-rate condition 444 can represent the serving communication capacity 140 along with the interference communication capacity 142. The sum-rate condition 444 can be for narrowing the pre-coding candidate set 416, for testing the pre-coding candidate set 416 according to a condition, or a combination thereof.

The object function module 406 can determine the sum-rate condition 444 based determining an instance of the assumption categories 432 appropriate for the communication environment. For example, the object function module 406 can determine the sum-rate condition 444 based on identifying or selecting an instance of the assumption categories 432 based on the receiver description 134, the comprehensive signal measure 132 therefrom, the long-term measure 150 therefrom, or a combination thereof.

The object function module 406 can determine the sum-rate condition 444 based on the assumption rate mechanism 434 corresponding to the selected or identified instance of the assumption categories 432. The object function module 406 can calculate the sum-rate condition 444 as output of the selected or identified instance of the assumption rate mechanism 434 using the receiver description 134 as an input.

Continuing with the detailed example above, the object function module 406 can identify or select the all-common setting 436, the all-private setting 438, or the specific-model setting 440 based on the comprehensive signal measure 132, the long-term measure 150, or a combination thereof. The object function module 406 can identify or select according to the threshold profile predetermined by the computing system 100. As a more specific example, the object function module 406 can compare the long-term measure 150 to the long-term threshold, compare the comprehensive signal measure 132 to the signal measure threshold, or a combination thereof to identify or select the instance of the assumption categories 432 representing the communication environment.

As a more specific example, the object function module 406 can identify or select the all-common setting 436 based on SIR being below or equal to a predetermined threshold level. The object function module 406 can otherwise identify or select the all-private setting 438 based on the long-term measure 150 being below or equal to a different threshold level. Otherwise, the object function module 406 can identify or select the specific-model setting 440.

Also as a more specific example, the object function module 406 can identify or select based on details of the interference-aware receiver 124. The object function module 406 can identify or select the all-common setting 436, the all-private setting 438, or the specific-model setting 440 when the receiving device is working on interference-aware successive decoding mechanism. The object function module 406 can identify or select the all-private setting 438 when the receiving device is working on interference-aware detection.

The object function module 406 can use the corresponding instance of the assumption rate mechanism 434 as described above in Equations (4)-(15) to calculate the sum-rate condition 444. The object function module 406 can calculate the sum-rate condition 444 as output of the method or the process represented by Equations (4), (10), or (14).

As a different detailed example, a different embodiment of the computing system 100 can include the object function module 406 using a specific condition set 442 for determining the sum-rate condition 444. The specific condition set 442 can include various instances of the sum-rate condition 444 corresponding to unique instances of the environmental factors, such as for the receiver count 144, the receiver description 134, or a combination thereof.

The specific condition set 442 can be implemented as a table or a grouping of conditions. The specific condition set 442 can correspond to the all-common setting 436, the all-private setting 438, or the specific-model setting 440 as described above.

For an exemplary condition with specific instance of the receiver count 144, the object function module 406 can access corresponding instance of the specific condition set 442. The corresponding instance of the specific condition set 442 can include various rank settings, formats, or a combination thereof corresponding to specific values of SNR, SIR, or a combination thereof.

As a more specific example, for the receiver count 144 of 2, the specific condition set 442 can include various settings, formats, or a combination thereof corresponding to SNR ranging from 0 dB-30 dB, SIR ranging from −10 dB to +10 dB, any range there-between, or a combination thereof. The specific condition set 442 can include rank 1 pre-coder, rank 2 pre-coder, time-domain multiple-access (TDMA) setting, or a combination thereof for each of the transmitters according to the value of SNR and SIR indicated by the receiver description 134.

Continuing with the specific example, the specific condition set 442 can include various assumption rate mechanism 434 corresponding to the all-common setting 436, the all-private setting 438, or the specific-model setting 440 for each instance of the SNR value, SIR value, or a combination thereof. The various assumption rate mechanism 434 can include:

$$R_{TDMA,L} = \max_i \left\{ \log_2 \left| I + \frac{2}{L} \rho_1 H_{ii} P_i P_i^H H_{ii}^H \right| \right\}. \quad \text{Equation (16).}$$

$$R_{P_1,P_2,\frac{M}{2},C} = \min \left\{ \sum_{i,j \neq i} \min \left\{ \log_2 \left| I + \frac{2}{M} \rho_1 H_{ii} P_i P_i^H H_{ii}^H \right|, \right. \right.$$
$$\left. \log_2 \left| I + \frac{2}{M} \rho_2 H_{ij} P_i P_i^H H_{ij}^H \right| \right\}, \min_{i,j \neq i} \left\{ \log_2 \right.$$
$$\left. \left| I + \frac{2}{M} \rho_1 H_{ii} P_i P_i^H H_{ii}^H + \frac{2}{M} \rho_2 H_{ij} P_i P_i^H H_{ij}^H \right| \right\} \right\}. \quad \text{Equation (17)}$$

$$R_{P_1,P_2,\frac{M}{2},P} = \sum_{i,j \neq i} \log_2$$
$$\left| I + \left( I + \frac{2}{M} \rho_2 H_{ji} P_j P_j^H H_{ji}^H \right)^{-1} \frac{2}{M} \rho_1 H_{ii} P_i P_i^H H_{ii}^H \right|. \quad \text{Equation (18)}$$

$$R_{P_1,P_2,M:\frac{M}{2},C} = \quad \text{Equation (19)}$$
$$\max_{m=1,2} \left\{ \min \left\{ \sum_{i,j \neq i} \min \left\{ \log_2 \left| I + \frac{2^{\delta(i-m)}}{M} \rho_1 H_{ii} P_i P_i^H H_{ii}^H \right|, \right. \right. \right.$$
$$\left. \log_2 \left| I + \frac{2^{\delta(i-m)}}{M} \rho_2 H_{ij} P_i P_i^H H_{ij}^H \right| \right\},$$
$$\min_{i,j \neq i} \left\{ \log_2 \left| I + \frac{2^{\delta(i-m)}}{M} \rho_1 H_{ii} P_i P_i^H H_{ii}^H + \right. \right.$$
$$\left. \left. \left. \frac{2^{\delta(i-m)}}{M} \rho_2 H_{ji} P_j P_j^H H_{ji}^H \right| \right\} \right\} \right\}.$$

$$R_{M,C} = \min \quad \text{Equation (20)}$$
$$\left\{ \sum_{i,j \neq i} \min \left\{ \log_2 \left| I + \frac{1}{M} \rho_1 H_{ii} H_{ii}^H \right|, \log_2 \left| I + \frac{1}{M} \rho_2 H_{ij} H_{ij}^H \right| \right\}, \right.$$
$$\left. \min_{i,j \neq i} \left\{ \log_2 \left| I + \frac{1}{M} \rho_1 H_{ii} H_{ii}^H + \frac{1}{M} \rho_2 H_{ji} H_{ji}^H \right| \right\} \right\}.$$

$$R_{P_1,P_2,\frac{M}{2},PC} = \max_{i,j \neq i} \{\min \quad \text{Equation (21)}$$
$$\{\min\{\log_2 |I + (I + \rho_2 C_{ji})^{-1} \rho_1 C_{ii}|, \log_2 |I + \rho_2 C_{ij}|\} +$$
$$\log_2 |I + \rho_1 C_{jj}|, \log_2 |I + \rho_2 C_{ij} + \rho_1 C_{jj}|\}\}$$

$$R_{P_1,P_2,M:\frac{M}{2},PC} = \quad \text{Equation (22)}$$
$$\max_{m=1,2} \left\{ \max_{i,j \neq i} \{\min\{\min\{\log_2 |I + (I + 2^{\delta(j-m)} \rho_2 C_{ji})^{-1} 2^{\delta(i-m)} \rho_1 \right.$$
$$C_{ii}|, \log_2 |I + 2^{\delta(i-m)} \rho_2 C_{ij}|\} +$$
$$\log_2 |I + 2^{\delta(j-m)} \rho_1 C_{jj}|, \log_2$$
$$|I + 2^{\delta(i-m)} \rho_2 C_{ij} + 2^{\delta(j-m)} \rho_1 C_{jj}|\}\}\}.$$

Equation (23)

The object function module 406 can use the appropriate instance of the assumption rate mechanism 434 as described by Equations (16)-(23). The object function module 406 can use the assumption rate mechanism 434 to determine the sum-rate condition 444.

For illustrative purposes, the object function module 406 has been described as using the specific condition set 442 for the receiver count 144 of 2. However, it is understood that the object function module 406 can include the specific condition set 442 corresponding to different instance of the receiver count 144, such as for 3 or more, different instance of 'M' or 'N' values, or a combination thereof. It is also understood that the object function module 406 can include multiple instances of the specific condition set 442 corresponding to unique environments, such as described by receiver count 144, 'M', 'N', or a combination thereof.

It has been discovered that the signaling assumption set 430 generated based on the receiver description 134 provides reduced error rates and increased throughput. The signaling assumption set 430 can be used to characterize various different scenarios utilizing the interference-aware receiver 124. The signaling assumption set 430 can be used to accurately capture and utilize the capabilities of the interference-aware receiver 124, increasing efficiency of the signal processing and reducing decoding or detecting errors.

It has further been discovered that the assumption categories 432 corresponding to the receiver description 134 provides increased efficiency. The assumption categories 432 can be based on information other than or in addition to the SINR, providing a more complete assessment of the communication environment for signal processing.

It has further been discovered that the assumption categories 432 including the all-common setting 436, the all-private setting 438, and the specific-model setting 440 with the resulting sum-rate condition 444 provides improved efficiency and minimize negative effects from interference for a group of transmitters. The sum-rate condition 444 resulting from quantifiable depiction or modeling of signals and devices can be used as test condition in coordinating and maximizing communication rate for all transmitters that can act as interference to each other.

It has further been discovered that the specific condition set 442 as described above provides increased efficiency. The specific condition set 442 can describe various values or processes in response to communication environment or condition while minimizing processing time or conditions in identifying or selecting from various assumption categories.

For illustrative purposes, the assumption categories 432 have been described to include three categories. However, it is understood that the assumption categories 432 can be greater or lesser than three categories, include various different modeling, correspond to different factors, or a combination thereof. For example, the assumption categories 432 can include other possible combinations of device capabilities, more than three receivers, or a combination thereof and utilize factors in addition to or in place of SIR, SNR, the long-term measure 150, or a combination thereof.

The object function module 406 can use the first control unit 212, the second control unit 234, the third control unit 312, the fourth control unit 334, the first communication unit 216, the second communication unit 236, the third communication unit 316, the fourth communication unit 336, or a combination thereof to determine the sum-rate condition 444. The object function module 406 can store the sum-rate condition 444 in the first communication unit 216, the second communication unit 236, the third communication unit 316, the fourth communication unit 336, the first storage unit 214, the second storage unit 246, the third storage unit 314, the fourth storage unit 346, or a combination thereof.

After generating the sum-rate condition 444, the control flow can be passed from the object function module 406 to the reduction module 408. The control flow can pass similarly as described above between the communication environment module 402 and the initial candidate module 404 but using processing results of the initial candidate module 404, such as the sum-rate condition 444.

The reduction module 408 is configured to reduce the pre-coding candidate set 416. The reduction module 408 can reduce or narrow the pre-coding candidate set 416 based on or according to the instance of the assumption categories 432 selected or identified by the object function module 406 from the signaling assumption set 430, the corresponding instance of the sum-rate condition 444, or a combination thereof.

Continuing with the specific example above, the reduction module 408 can narrow the pre-coding candidate set 416 based on the object function module 406 selecting the all-common setting 436, the all-private setting 438, or the specific-model setting 440. The reduction module 408 can otherwise narrow the pre-coding candidate set 416 based on the sum-rate condition 444 corresponding to the all-common setting 436, the all-private setting 438, or the specific-model setting 440 selected or identified from the signaling assumption set 430.

The reduction module 408 can include an environmental reduction mechanism 446. The environmental reduction mechanism 446 is a process or a method for eliminating candidate instances of the pre-coding adjustment 148 from the pre-coding candidate set 416 according to instance of the assumption categories 432 describing or matching the communication environment. The environmental reduction mechanism 446 can be for logically reducing the pre-coding candidate set 416 according to the communication environment including the first user device 102 corresponding to the receiver signal 122, the second user device 104 intended for the interference signal 118, characteristics or qualities associated thereto, or a combination thereof.

The environmental reduction mechanism 446 can include a mapping or a grouping of the elements or portions of the pre-coding candidate set 416 according to various possible instances of the assumption categories 432. The environmental reduction mechanism 446 can also include a condition, a requirement, or a combination thereof for each possible instance of the assumption categories 432 for evaluating the elements or portions of the pre-coding candidate set 416. The reduction module 408 can include environmental reduction mechanism 446 predetermined by the computing system 100.

The reduction module 408 can narrow the pre-coding candidate set 416 according to the environmental reduction mechanism 446. The reduction module 408 can narrow the pre-coding candidate set 416 corresponding to the instance of the assumption categories 432 selected or identified by the object function module 406 or the corresponding instance of the sum-rate condition 444. The reduction module 408 can narrow by discarding elements or portions of the pre-coding candidate set 416 based on the selected or identified instance of the assumption categories 432 or the corresponding instance of the sum-rate condition 444 according to the environmental reduction mechanism 446.

The reduction module 408 can narrow the pre-coding candidate set 416 to include elements or portions corresponding to potential candidate for the pre-coding adjustment 148 directly associated with, linked to, or appropriate for the selected or identified instance of the assumption categories 432 or the corresponding instance of the sum-rate condition 444. The reduction module 408 can narrow the pre-coding candidate set 416 from a finite set covering all instances of the assumption categories 432 to a smaller set corresponding to a specific instance of the assumption categories 432 appropriate for the communication environment.

It has been discovered that narrowing the pre-coding candidate set 416 based on the instance of the assumption categories 432 identified or selected from the signaling assumption set 430 or the corresponding instance of the sum-rate condition 444 provides improved efficiency. The narrowing of the pre-coding candidate set 416 provides systematic method of generating instance of the pre-coding adjustment 148 appropriate for the communication environment. Further, narrowing based on specific conditions in the communication environment can reduce the number of candidates evaluated for generating appropriate instance of the pre-coding adjustment 148.

The reduction module 408 can use the first control unit 212, the second control unit 234, the third control unit 312, the fourth control unit 334, the first communication unit 216, the second communication unit 236, the third communication unit 316, the fourth communication unit 336, or a combination thereof to narrow the pre-coding candidate set 416. The reduction module 408 can stored the narrowed instance of the pre-coding candidate set 416 in the first communication unit 216, the second communication unit 236, the third communication unit 316, the fourth communication unit 336, the first storage unit 214, the second storage unit 246, the third storage unit 314, the fourth storage unit 346, or a combination thereof.

After narrowing the pre-coding candidate set 416, the control flow can be passed from the reduction module 408 to the coordination module 410. The control flow can pass similarly as described above between the communication environment module 402 and the initial candidate module 404 but using processing results of the initial candidate module 404, such as the narrowed instance of the pre-coding candidate set 416.

The coordination module 410 is configured to generate the pre-coding adjustment 148. The coordination module 410 can generate the pre-coding adjustment 148 for multiple transmissions, such as for simultaneous or contemporaneous signals.

The coordination module 410 can generate the coordination pre-coding set 146 including one or more instance of the pre-coding adjustment 148 for coordinating signals across multiple node devices, such as the first node device 106, the second node device 108, or a combination thereof. The coordination module 410 can generate the coordination pre-coding set 146 or the pre-coding adjustment 148 therein from the pre-coding candidate set 416 for coordinating the serving signal 116 along with the interference signal 118 or subsequent instances thereof.

The coordination module 410 can generate the coordination pre-coding set 146 or the pre-coding adjustment 148 therein after narrowing the pre-coding candidate set 416 based on the environmental reduction mechanism 446 as described above. The coordination module 410 can generate the coordination pre-coding set 146 or the pre-coding adjustment 148 therein based on analyzing the narrowed instance of the pre-coding candidate set 416.

The coordination module 410 can generate the coordination pre-coding set 146 or the pre-coding adjustment 148 therein based on maximizing the sum-rate condition 444 communicating the serving signal 116, the interference signal 118, a subsequent instance thereof, or a combination thereof. The coordination module 410 can generate the pre-coding adjustment 148 based on:

$$\hat{i} = \arg\max_i \hat{R}_i.$$ Equation (24).

The sum-rate condition 444 specific to transmitter 'i' can be represented by '$\hat{R}_i$'.

The coordination module 410 can generate the coordination pre-coding set 146 as a collection of the pre-coding adjustment 148 maximizing the sum-rate condition 444 for communicating to each of the receivers up to the receiver count 144. The coordination module 410 can generate the coordination pre-coding set 146 based on:

$$\{w_k\}_{k=1}^{K=W_i}.$$ Equation (25).

The coordination module 410 can communicate the coordination pre-coding set 146 or one or more instances of the pre-coding adjustment 148 to the transmitting device, such as the first node device 106, the second node device 108, or a combination thereof. The coordination module 410 can communicate the one or more instances of the pre-coding adjustment 148 according to the transmitting device corresponding to the pre-coding adjustment 148 or the receiver device associated thereto. The coordination module 410 can use the node link 114 of FIG. 1, appropriate inter-device interface, or a combination thereof to communicate the coordination pre-coding set 146 or one or more instances of the pre-coding adjustment 148.

The coordination module 410 can further apply the appropriate instance of the pre-coding adjustment 148 at the transmitting device. For example, the first node device 106 can apply the appropriate instance of the pre-coding adjustment 148 to the content 112 of FIG. 1 for the serving signal 116 or a subsequent instance thereof. Also for example, the second node device 108 can apply the appropriate instance of the pre-coding adjustment 148 from the coordination pre-coding set 146 to the content 112 for the interference signal 118 or a subsequent instance thereof.

It has been discovered that the pre-coding adjustment 148 based on maximizing the sum-rate condition 444 specific to the communication environment provides increased efficiency. The sum-rate condition 444 can include or represent availability and capability of the interference-aware receiver 124 as described above through the assumption categories 432. Maximization of the sum-rate condition 444 can fully utilize the availability and capability of the interference-aware receiver 124 for the communication in the computing system 100.

It has further been discovered that the coordination pre-coding set 146 including instances of the pre-coding adjustment 148 specific for transmitters and maximizing the sum-rate condition 444 provides increased throughput for the computing system 100. The coordination pre-coding set 146 based on considering the sum-rate condition 444 corresponding to multiple simultaneous transmissions can minimize negative interferences or ignore insignificant interferences for the set of the multiple simultaneous transmissions. The resulting coordination pre-coding set 146 can minimize the interfering effect between signals while maximizing communication speed for the multiple simultaneous transmissions.

It has further been discovered that the pre-coding adjustment 148 resulting from processing the narrowed instance of the pre-coding candidate set 416 provides decreased processing complexity. The narrowed instance of the pre-coding candidate set 416 provides reduced number in candidate instances of the pre-coding adjustment 148. Since the reduction was specific to and logically associated with the communication environment, only the relevant candidates can be analyzed and reduce the size or complexity of the analysis.

After applying the pre-coding adjustment 148 and communicating the signal, the control flow can be passed back to the communication environment module 402. The coordination pre-coding set 146 can be used as basis and updated for subsequent instances of communication. The computing system 100 can further receive the receiver description 134 corresponding to the transmitted message and repeat the process described above to adjust or update the coordination pre-coding set 146.

Figure 5:
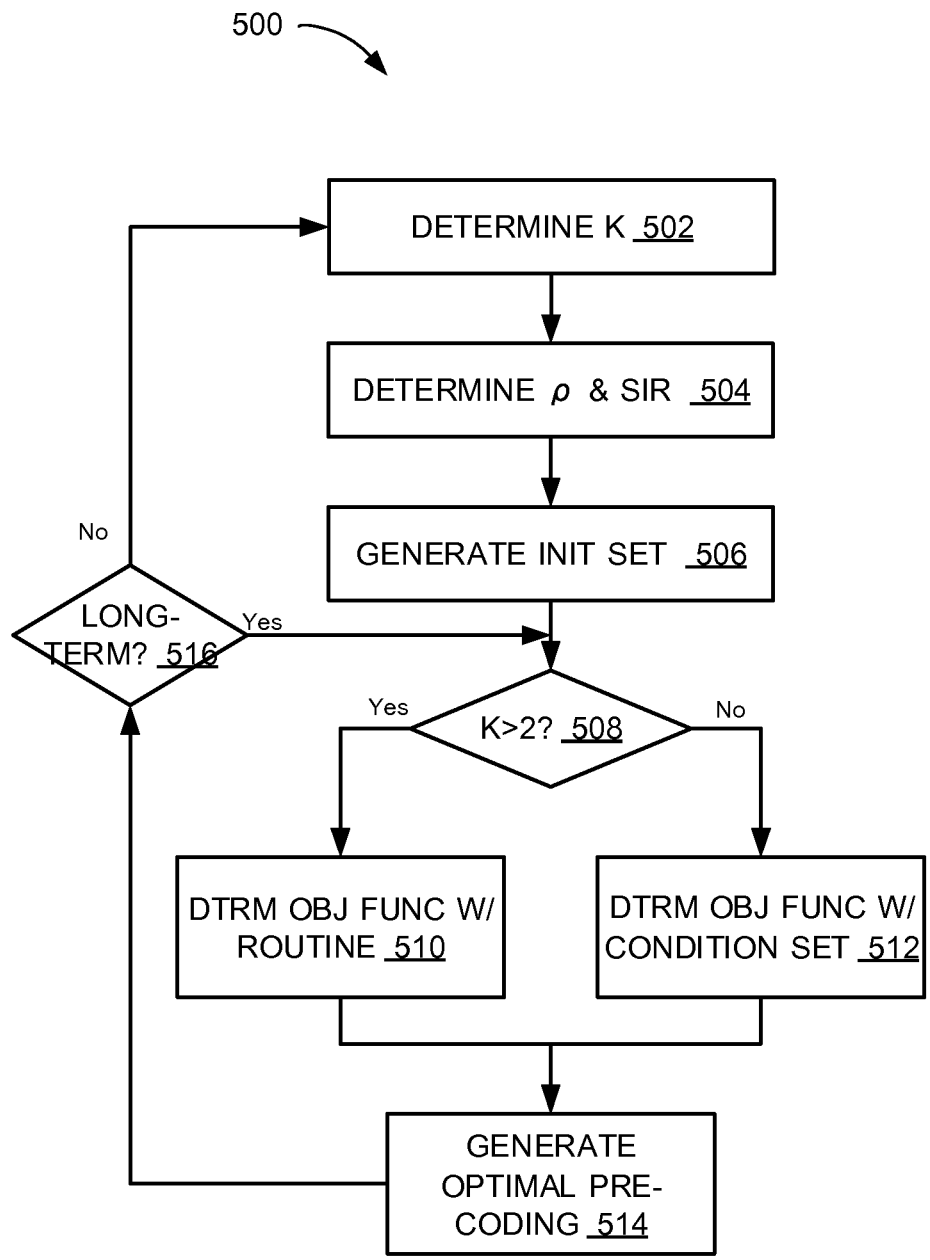
FIG. 5 is an exemplary operational flowchart of the computing system of FIG. 1.

Referring now to FIG. 5, therein is shown an exemplary operational flowchart 500 of the computing system 100. The exemplary operational flowchart 500 can include determine receiver count 144 of FIG. 1 in a box 502. The computing system 100 can determine the receiver count 144 based on requests, initiations, the receiver description 134 of FIG. 1, or a combination thereof for the user device, such as the first user device 102 of FIG. 1 or the second user device 104 of FIG. 1, according to process or method predetermined by the computing system 100 or a communication standard.

The computing system 100 can use the communication environment module 402 of FIG. 4 to determine the receiver count 144. Details of the communication environment module 402 is described above.

The exemplary operational flowchart 500 can include determine the long-term measure 150 of FIG. 1 and the comprehensive signal measure 132 of FIG. 1 in a box 504. The computing system 100 can determine the long-term measure 150 and the comprehensive signal measure 132 based on the receiver description 134. The computing system 100 can use the communication environment module 402 to determine the long-term measure 150 and the comprehensive signal measure 132.

The exemplary operational flowchart 500 can include generate initial set in a box 506. The computing system 100 can generate initial set by generating the pre-coding candidate set 416 of FIG. 1. The computing system 100 can generate the pre-coding candidate set 416 based on the receiver description 134 or the channel measure, such as the serving channel measure 126 of FIG. 1 or the interference channel measure 128 of FIG. 1 associated thereto. The computing system 100 can generate the pre-coding candidate set 416 using the initial candidate module 404 of FIG. 4. Details regarding the initial candidate module 404 is described above.

The exemplary operational flowchart 500 can include evaluate the receiver count 144 in a box 508. The exemplary operation flowchart 500 can use the object function module 406 of FIG. 4 to evaluate the receiver count 144 against a threshold predetermined by the computing system 100. For example, the threshold can be predetermined as 2 as exemplified above.

The exemplary operational flowchart 500 can include determine object function with routine in a box 510. The computing system 100 can use the routine described above for determining the sum-rate condition 444 of FIG. 4. The computing system 100 can use the routine to determine the sum-rate condition 444 when the receiver count 144 is greater than the threshold.

The exemplary operational flowchart 500 can include determine object function with condition set in a box 512. The computing system 100 can use the specific condition set 442 of FIG. 4 to determine the sum-rate condition 444 as described above. The computing system 100 can use the specific condition set 442 when the receiver count 144 is less than or equal to the threshold.

The computing system 100 can use the object function module 406 to determine the sum-rate condition 444, using the routine, the specific condition set 442, or a combination thereof. Details regarding the object function module 406 is described above.

The computing system 100 can include generate optimal pre-coding in a box 514. The computing system 100 can generate the coordination pre-coding set 146 of FIG. 1 including the pre-coding adjustment 148 of FIG. 1 maximizing the sum-rate condition 444. The computing system 100 can generate the coordination pre-coding set 146 based on narrowing the pre-coding candidate set 416 and testing elements in the pre-coding candidate set 416 according to maximizing the sum-rate condition 444.

The computing system 100 can use the reduction module 408 of FIG. 4, the coordination module 410 of FIG. 4, or a combination thereof to generate the coordination pre-coding set 146 including the pre-coding adjustment 148. Details regarding the reduction module 408 and the coordination module 410 are described above.

The computing system 100 can include evaluate long-term cooperation in a box 516. The computing system 100 can use the communication environment module 402 to evaluate the long-term cooperation between devices. The computing system 100 can utilize a method or a process predetermined by the computing system 100 or the communication standard to evaluate the long-term cooperation.

The computing system 100 can pass the control flow to the box 508 and evaluate the receiver count 144 when the long-term cooperation is present. The computing system 100 can pass the control flow to the box 502 and determine the receiver count 144 when the long-term cooperation is not present.

Figure 6:
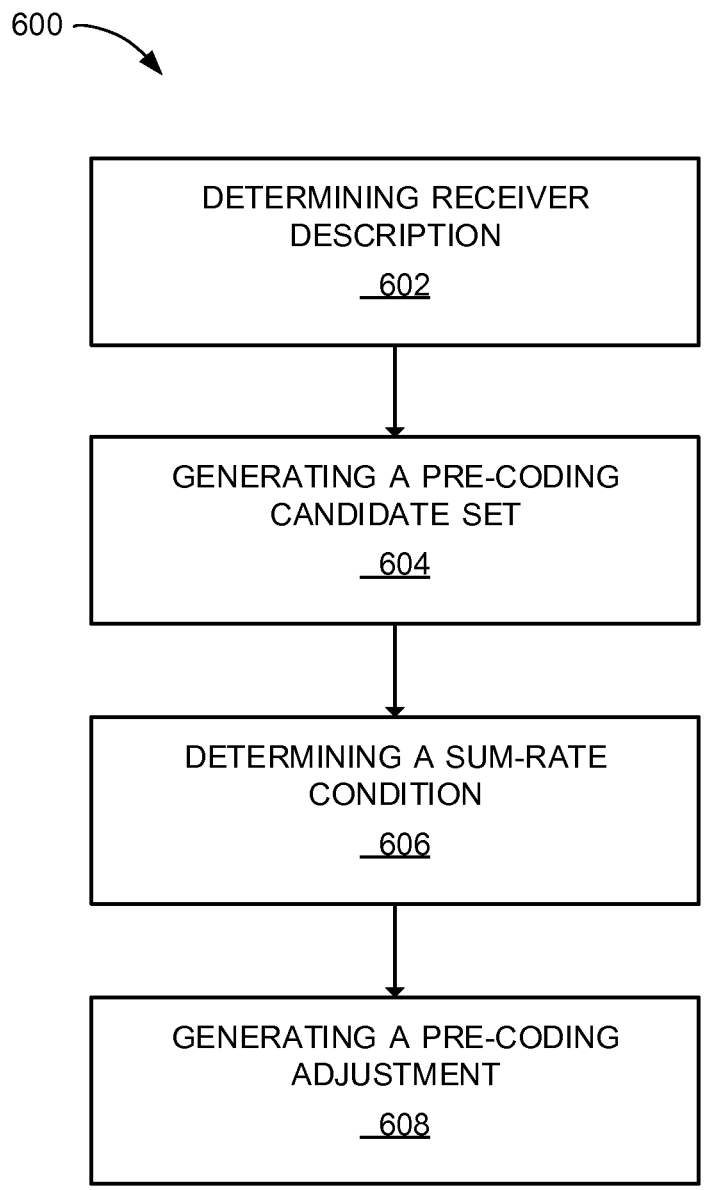
FIG. 6 is a flow chart of a method of operation of a computing system in a further embodiment of the present invention.

Referring now to FIG. 6, therein is shown a flow chart 600 of a method of operation of a computing system in a further embodiment of the present invention. The method 600 includes: determining receiver description for representing a receiver signal corresponding to serving signal contemporaneous with an interference signal from an interference source at an interference-aware receiver in a block 602; generating a pre-coding candidate set based on the receiver description for adjusting the serving signal or a subsequent instance thereof in a block 604; determining a sum-rate condition for representing the serving signal along with the interference signal in a block 606; and generating a pre-coding adjustment maximizing the sum-rate condition from the pre-coding candidate set for communicating the serving signal or a subsequent instance thereof in a block 608.

The modules described in this application can be hardware implementation or hardware accelerators, including passive circuitry, active circuitry, or both, in the first communication unit 216 of FIG. 2, the second communication unit 236 of FIG. 2, the third communication unit 316 of FIG. 3, the fourth communication unit 336 of FIG. 3, the first control unit 212 of FIG. 2, the second control unit 238 of FIG. 2, the third control unit 312 of FIG. 3, the fourth control unit 338 of FIG. 3, or a combination thereof. The modules can also be hardware implementation or hardware accelerators, including passive circuitry, active circuitry, or both, within the first user device 102 of FIG. 1, the second user device 104 of FIG. 1, the first node device 106 of FIG. 1, the second node device 108 of FIG. 1, or a combination thereof but outside of the first communication unit 216, the second communication unit 236, the third communication unit 316, the fourth communication unit 336, the first control unit 212, the second control unit 234, the third control unit 312, the fourth control unit 334, or a combination thereof.

The computing system 100 of FIG. 1 has been described with module functions or order as an example. The computing system 100 can partition the modules differently or order the modules differently. For example, the object function module 406 of FIG. 3 can be implemented as multiple modules separately generating the signaling assumption set 430 of FIG. 3 in one module and selecting or identifying from within the signaling assumption set 430 in another module. Also for example, the object function module 406 and the reduction module 408 of FIG. 3 can be combined.

For illustrative purposes, the various modules have been described as being specific to the first user device 102, the second user device 104, the first node device 106, the second node device 108, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the third communication unit 316, the fourth communication unit 336, the first control unit 212, the second control unit 234, the third control unit 312, the fourth control unit 334, or a combination thereof can represent the non-transitory computer readable medium. The first communication unit 216, the second communication unit 236, the third communication unit 316, the fourth communication unit 336, the first control unit 212, the second control unit 234, the third control unit 312, the fourth control unit 334, or a combination thereof, or a portion therein can be removable from the first user device 102, the second user device 104, the first node device 106, the second node device 108, or a combination thereof. Examples of the non-transitory computer readable medium can be a non-volatile memory card or stick, an external hard disk drive, a tape cassette, or an optical disk.

The physical transformation of the receiver signal 122 of FIG. 1 from the pre-coding adjustment 148 of FIG. 1 results in the movement in the physical world, such as content displayed or recreated for the user on the first user device from processing the serving content therein. The content reproduced on the first user device 102, such as navigation information or voice signal of a caller, can influence the user's movement, such as following the navigation information or replying back to the caller. Movement in the physical world results in changes to the channel measures, the geographic location of the first user device 102, interfering transmissions, or a combination thereof, which can be fed back into the computing system 100 and influence the receiver description 134 of FIG. 1 and the signaling assumption set 430 of FIG. 3.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
an inter-device interface configured to determine a receiver description for representing an interference-aware receiver receiving a receiver signal corresponding to a serving signal contemporaneous with an interference signal from an interference source, the interference-aware receiver configured to process and utilize content of the interference signal;
a communication unit, coupled to the inter-device interface, configured to:
generate a pre-coding candidate set based on the receiver description for adjusting the serving signal or a subsequent instance thereof,
determine a sum-rate condition for representing a processing capacity for the serving signal and the interference signal, wherein the processing capacity includes a speed of communication, an amount of communicated information, or a combination thereof, and
generate a pre-coding adjustment maximizing the sum-rate condition from the pre-coding candidate set for communicating the serving signal or a subsequent instance thereof to the interference-aware receiver.

2. The system as claimed in claim 1 wherein:
the inter-device interface is configured to determine the receiver description including receiving the receiver description including a channel feedback; and
the communication unit is configured to generate the pre-coding candidate set based on utilizing a singular-value decomposition mechanism with the channel feedback.

3. The system as claimed in claim 1 wherein the communication unit is configured to determine the sum-rate condition based on a signaling assumption set for representing a first user device corresponding to the receiver signal, a second user device intended for the interference signal, or a combination thereof.

4. The system as claimed in claim 1 wherein the communication unit is configured to generate the pre-coding adjustment based on an environmental reduction mechanism for logically reducing the pre-coding candidate set according to a first user device corresponding to the receiver signal, a second user device intended for the interference signal, or a combination thereof.

5. The system as claimed in claim 1 wherein the communication unit is configured to:
determine the sum-rate condition based on determining an assumption category for representing a first user device corresponding to the receiver signal, a second user device intended for the interference signal, or a combination thereof; and
narrow the pre-coding candidate set based on the assumption category.

6. The system as claimed in claim 1 wherein:
the inter-device interface is configured to determine the receiver description including receiving the receiver description including a channel feedback;
the communication unit is configured to:
determine the sum-rate condition for narrowing the pre-coding candidate set,
generate the pre-coding adjustment after narrowing the pre-coding candidate set for coordinating the serving signal along with the interference signal or subsequent instances thereof, and
apply the pre-coding adjustment for communicating the serving signal or a subsequent instance thereof.

7. The system as claimed in claim 6 wherein the communication unit is configured to:
calculate a decomposition output set based on a singular-value decomposition mechanism and the channel feedback; and
generate the pre-coding candidate set based on one or more components of the decomposition output set.

8. The system as claimed in claim 6 wherein:
determine a comprehensive signal measure for representing the serving signal, the interference signal, or a combination thereof;

determine the sum-rate condition based on the comprehensive signal measure.

9. The system as claimed in claim 6 wherein the communication unit is configured to:
   determine a long-term measure for representing the serving signal, the interference signal, the channel feedback, or a combination thereof; and
   determine the sum-rate condition based on the long-term measure.

10. The system as claimed in claim 6 wherein the communication unit is configured to:
    generate an signaling assumption set including an all-common setting, an all-private setting, a specific-model setting, or a combination thereof for representing a first user device corresponding to the receiver signal, a second user device intended for the interference signal, or a combination thereof; and
    narrow the pre-coding candidate set based on selecting the all-common setting, the all-private setting, or the specific-model setting.

11. A method of operation of a computing system comprising:
    determining a receiver description for representing an interference-aware receiver receiving a receiver signal corresponding to a serving signal contemporaneous with an interference signal from an interference source, the interference-aware receiver configured to process and utilize content of the interference signal;
    generating a pre-coding candidate set based on the receiver description for adjusting the serving signal or a subsequent instance thereof;
    determining a sum-rate condition for representing a processing capacity for the serving signal and the interference signal, wherein the processing capacity includes a speed of communication, an amount of communicated information, or a combination thereof; and
    generating a pre-coding adjustment maximizing the sum-rate condition from the pre-coding candidate set with a communication unit for communicating the serving signal or a subsequent instance thereof to the interference-aware receiver.

12. The method as claimed in claim 11 wherein:
    determining the receiver description includes receiving the receiver description including a channel feedback; and
    generating the pre-coding candidate set includes generating the pre-coding candidate set based on utilizing a singular-value decomposition mechanism with the channel feedback.

13. The method as claimed in claim 11 wherein determining the sum-rate condition includes determining the sum-rate condition based on a signaling assumption set for representing a first user device corresponding to the receiver signal, a second user device intended for the interference signal, or a combination thereof.

14. The method as claimed in claim 11 wherein generating the pre-coding adjustment includes generating the pre-coding adjustment based on an environmental reduction mechanism for logically reducing the pre-coding candidate set according to a first user device corresponding to the receiver signal, a second user device intended for the interference signal, or a combination thereof.

15. The method as claimed in claim 11 wherein:
    determining the sum-rate condition based on determining an assumption category for representing a first user device corresponding to the receiver signal, a second user device intended for the interference signal, or a combination thereof; and
    further comprising:
    narrowing the pre-coding candidate set based on the assumption category.

16. A non-transitory computer readable medium including instructions for a computing system comprising:
    determining a receiver description for representing an interference-aware receiver receiving a receiver signal corresponding to a serving signal contemporaneous with an interference signal from an interference source, the interference-aware receiver configured to process and utilize content of the interference signal;
    generating a pre-coding candidate set based on the receiver description for adjusting the serving signal or a subsequent instance thereof;
    determining a sum-rate condition for representing a processing capacity for the serving signal and the interference signal, wherein the processing capacity includes a speed of communication, an amount of communicated information, or a combination thereof; and
    generating a pre-coding adjustment maximizing the sum-rate condition from the pre-coding candidate set for communicating the serving signal or a subsequent instance thereof to the interference-aware receiver.

17. The non-transitory computer readable medium as claimed in claim 16 wherein:
    determining the receiver description includes receiving the receiver description including a channel feedback; and
    generating the pre-coding candidate set includes generating the pre-coding candidate set based on utilizing a singular-value decomposition mechanism with the channel feedback.

18. The non-transitory computer readable medium as claimed in claim 16 wherein determining the sum-rate condition includes determining the sum-rate condition based on a signaling assumption set for representing a first user device corresponding to the receiver signal, a second user device intended for the interference signal, or a combination thereof.

19. The non-transitory computer readable medium as claimed in claim 16 wherein generating the pre-coding adjustment includes generating the pre-coding adjustment based on an environmental reduction mechanism for logically reducing the pre-coding candidate set according to a first user device corresponding to the receiver signal, a second user device intended for the interference signal, or a combination thereof.

20. The non-transitory computer readable medium as claimed in claim 16 wherein:
    determining the sum-rate condition based on determining an assumption category for representing a first user device corresponding to the receiver signal, a second user device intended for the interference signal, or a combination thereof; and
    further comprising:
    narrowing the pre-coding candidate set based on the assumption category.

* * * * *